March 11, 1958   J. E. WILLIAMS   2,826,646
INTERLOCKING AMPLIFIER
Filed Aug. 6, 1952   6 Sheets-Sheet 1

INVENTOR.
John E. Williams

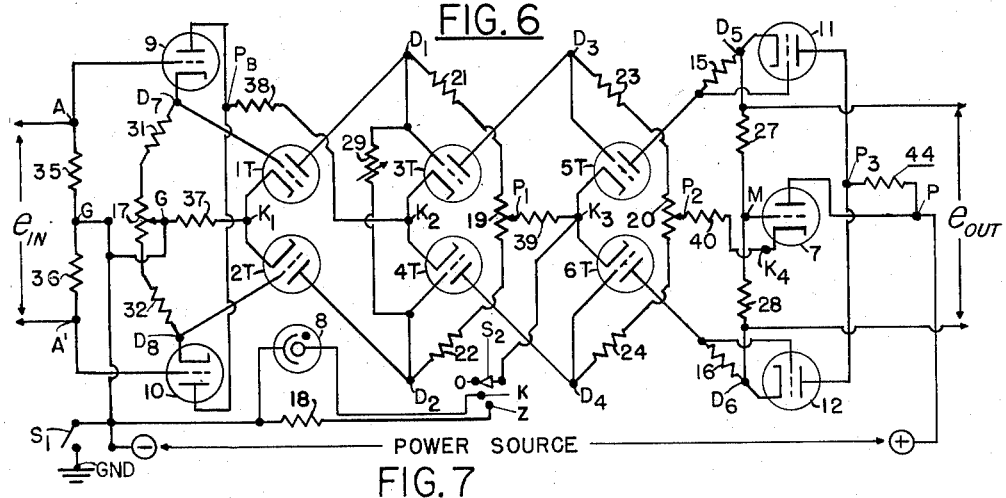

March 11, 1958 J. E. WILLIAMS 2,826,646
INTERLOCKING AMPLIFIER
Filed Aug. 6, 1952 6 Sheets-Sheet 4

INVENTOR
John E. Williams

March 11, 1958 J. E. WILLIAMS 2,826,646
INTERLOCKING AMPLIFIER
Filed Aug. 6, 1952 6 Sheets-Sheet 5

INVENTOR
John E. Williams

March 11, 1958
J. E. WILLIAMS
2,826,646
INTERLOCKING AMPLIFIER
Filed Aug. 6, 1952
6 Sheets-Sheet 6
FIG. 12
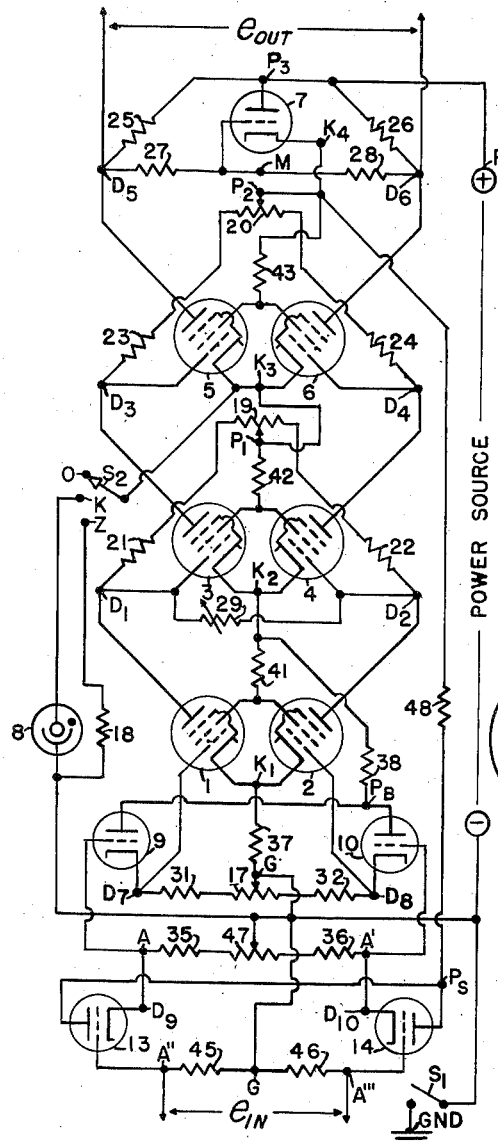
FIG. 13
FIG. 13a
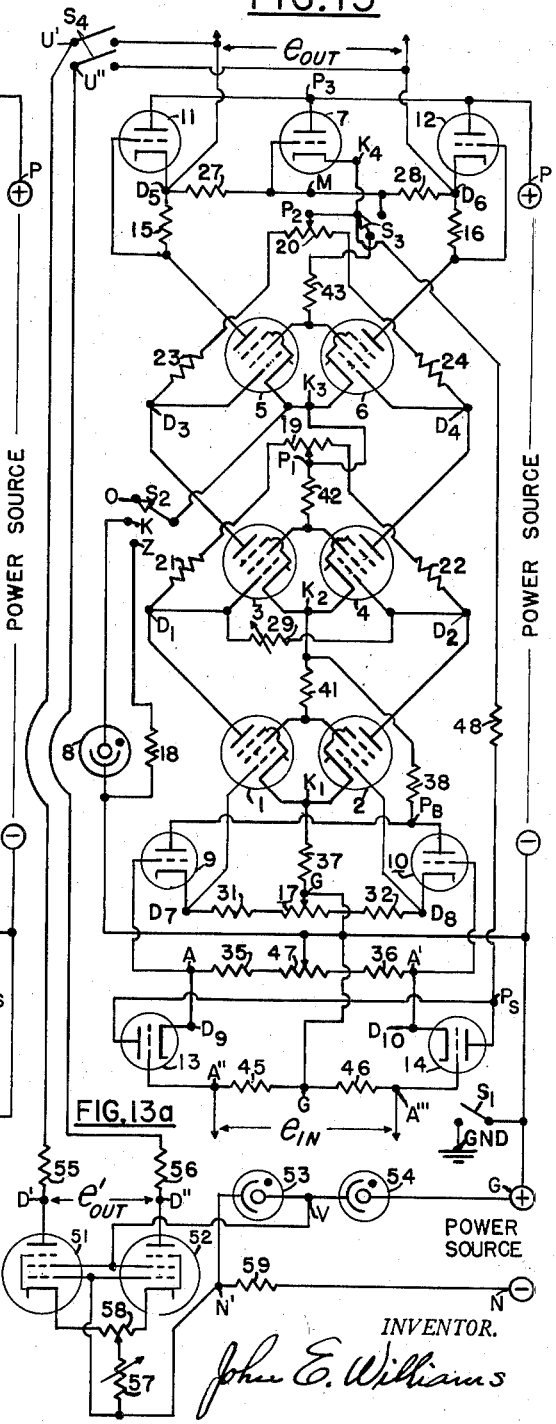
INVENTOR.
John E. Williams

United States Patent Office 2,826,646
Patented Mar. 11, 1958

2,826,646

INTERLOCKING AMPLIFIER

John E. Williams, Linwood, N. J.

Application August 6, 1952, Serial No. 302,886

33 Claims. (Cl. 179—171)

The present invention relates to an interlocking amplifier and more particularly to a symmetrical and linear, D. C. and A. C. full-wave differential amplifier of negligible phase shift.

In the known art, as exemplified by Mansford #2,424,893 of July 29, 1947, and by Williams #2,545,507 of March 20, 1951, a "series-fed" full-wave differential amplifier has variously been proposed comprising a plurality of pairs of tubes energized in series-connected cascade, the cathodes of successive pairs of tubes being joined respectively at successive common electrical junctions, a typical amplifying sequence of adjacent pairs of tubes being formed by connection of the anodes of the preceding pair of tubes respectively through two equal plate load resistors to the common cathode junction of the following pair of tubes, and by connection of the control-grids of the following pair of tubes respectively to the anodes of the preceding pair of tubes. This first general method of forming a sequence of direct-connected amplifying stages fundamentally derives stability from employment throughout of series-fed energization, and results in low values of voltage gain per stage by limiting the energizing voltage drop across each pair of plate load resistors to low values within the class A range of control-grid bias voltage of the related following pair of tubes, thereby objectionably requiring an excessive number of stages and component tubes in an amplifier of desired high voltage gain.

It has alternatively been proposed to alter the formation of a typical amplifying sequence of adjacent pairs of tubes by connecting the anodes of the preceding pair of tubes respectively through two equal plate load resistors to the common cathode junction of the following pair of tubes and by connecting the control-grids of the following pair of tubes respectively to opposite points in two equal voltage dividing networks energized by common connection to "higher potential" and excited by connection of the opposite ends thereof respectively to the anodes of the preceding pair of tubes. This second general method of forming a direct-connected amplifying sequence is uneconomical in its utilization of energizing voltage and, while recognizing and alleviating a serious limitation of the first general method, suffers by being degenerative in character thereby continuing to require a disproportionately large number of stages and component tubes in an amplifier of desired high voltage gain. The second general method also suffers by inclusion of additional component parts thereby increasing distributed capacity and contributing to phase shift of amplified signal voltage.

A third method has been proposed, as exemplified by Williams #2,543,819 of March 6, 1951, to employ a plurality of push-pull-differential electronic bridges energized in parallel-connection from a common power source and stabilized by matching element means, each push-pull-differential bridge or stage requiring a differential load impedance and four variable impedance arms respectively comprised in four electronic tubes, correction of distortion being effected by differential action within each stage, each typical stage requiring an independent energizing current path connected between the cathode junction of bridge input tubes and the amplifier negative terminal, the energy expended in this path not being otherwise usefully employed, and each typical stage including a matching element comprising at least one additional tube. This third general method of forming a direct-connected amplifying sequence, while stable and substantially linear, suffers by requiring an excessive number of tubes in an amplifier of desired high voltage gain, also suffers with respect to compensation of phase shift by reason of the variable impedances included in the load-section arms of each component bridge, as for instance, resulting from employment of triodes in full-wave differential follower relation, and further lacks economy of energizing current.

The major object of the present invention is to provide a stable, symmetrical and linear, D. C. and A. C. differential amplifier of low noise level, low distortion and negligible phase shift in which the disadvantages above referred to are substantially avoided.

The present invention discloses four variants of a generic full-wave D. C. and A. C. interlocking amplifier, the first variant being embodied in the amplifiers of Figs. 4 and 10, the second variant being embodied in the amplifiers of Figs. 8 and 11, the third variant being embodied in the amplifiers of Figs. 5, 7 and 12, and the fourth variant being embodied in the amplifiers of Figs. 6, 9 and 13. The several variants introduced useful variation of amplifier input and output detail. The numerical sequence of figures progressively establishes essential theory.

According to the present invention there is provided a symmetrical and linear, D. C. and A. C., broad band, full-wave-differential amplifier of negligible phase shift comprising a progressively amplifying sequence of successively-adjacent and successively-interresponsive amplifying stages superimposed on the electrical structure of a stabilizing sequence of successively-adjacent and successively-interresponsive electronic bridges.

The terms "adjacent" and "successively-adjacent," as herein employed, imply a consecutive sequence of amplifying bridges responsively connected in full-wave relation, the input-section arms of each amplifying bridge being responsively connected respectively to opposite differential terminals of the preceding adjacent bridge, and the conductances of the two legs or current-carrying branches of each amplifying bridge respectively varying in opposite sense as excited by full-wave-differential signal voltage. Additionally and importantly, the aggregate conductance of each amplifying bridge is responsive, in a stabilizing sense, to the differential-midpoint-potential of the preceding adjacent bridge, the aggregate conductance of a bridge being a virtual conductance equivalent to the parallel-connected conductances of the two bridge legs or current-carrying branches, and the differential-midpoint-potential of a bridge being a virtual potential taken at any instant of time as the instantaneous arithmetic means of the potentials at opposite differential terminals of the bridge.

It is here importantly noted that where amplified signal voltage is symmetrical and distortionless, the differential-midpoint-potential of each amplifying bridge varies only with variations of bridge energizing voltage. Full-wave-differentially amplified signal voltage thus occurs at a variable potential level, and its magnitude occurs with substantial independence from normal variation of bridge energizing voltage.

The terms "contiguous" and "successively-contiguous," as herein employed, imply a group of bridges forming a direct-current path by successive direct-connection of their energizing axes in series-connected cascade, each of the successively-contiguous series-connected bridges being respectively and principally polarized in inverse proportion to the aggregate conductance thereof by energizing current therethrough, the energizing current therethrough being substantially common to the instant group of series-connected bridges, the energizing current therethrough also being inversely proportional to the total of the aggregate impedances of the group of successively-contiguous series-connected bridges.

Alternate bridges of the stabilizing sequence of successively-adjacent bridges are alternately included in first and second complementary groups of successively-contiguous bridges respectively energized by first and second complementary energizing currents, the energizing currents being derived in parallel-connection from a common power source. For example, odd numbered bridges of the stabilizing sequence are series-connected for energization by first energizing current and even numbered bridges are series-connected for energization by second energizing current.

It will be understood that two connections per amplifying bridge are required to provide responsive connection of each amplifying bridge, in full-wave relation, to opposite differential terminals of the preceding adjacent bridge. It will also be understood that these two connections per amplifying bridge, acting in virtual-paralleled relation, additionally and importantly function in current-regulating relation to control the aggregate conductance of, and energizing current through, each amplifying bridge as stabilizingly excited by the differential-midpoint-potential of the preceding adjacent bridge.

It will further be understood that the virtual connection, in current regulating relation, of each amplifying bridge responsive to the differential-midpoint-potential of the preceding adjacent bridge constitutes, within the stabilizing sequence of successively-adjacent bridges, distributed and successive cross-responsive-connection of the two complementary energizing currents and importantly establishes proportionate, stabilized and interlocked division of amplifier energizing voltage. This proportionate division of amplifier energizing voltage is characterized by successive stabilized ranges-of-potentials taken successively between consecutive differential-midpoint-potentials, each differential-midpoint-potential, so stabilized, acting in control of, and having a substantially fixed relation to, the potential at the negative energizing terminal of the adjacent bridge following the bridge containing said differential-midpoint-potential, the cathode terminal ($K_4$) of a "compensating conductance" (7) being equivalent in a stabilizing sense to the negative energizing terminal of an amplifying bridge.

It will be understood that each of the ranges-of-potentials successively established between consecutive differential-midpoint-potentials is, in general, substantially common to the input-section of an amplifying bridge and to the load-section of its preceding adjacent bridge thereby successively interlocking successively-adjacent bridges, the multiple employment of each shared range-of-potentials providing fundamental economy of amplifier energizing voltage, and also providing in each amplifier bridge full availability of full-wave-differentially amplified signal voltage.

It is here noted that the family of interlocking amplifiers generically includes at least three successively-adjacent bridges, two of which are successively-contiguous and energized by one of the complementary energizing currents, the remaining bridge being energized by the other complementary energizing current, the two complementary energizing currents being progressively cross-responsively connected, each of the energizing voltages successively taken at consecutive positive energizing terminals of successively-adjacent bridges respectively overlapping the energizing voltage taken at the positive energizing terminal of the preceding adjacent bridge, and the range-of-potentials across the input-section of each amplifying bridge being substantially common with the range-of-potentials across the load-section of the preceding adjacent bridge.

According to the present invention an initial stabilized self-biasing voltage is generated by second energizing current flowing through a self-biasing resistor (37) connected between the amplifier negative energizing terminal and the negative terminal of the first amplifying bridge, the first amplifying bridge being the second bridge in the stabilizing sequence of successively-adjacent bridges, the first bridge in the stabilizing sequence of successively-adjacent bridges being a balancing bridge. The balancing bridge may be formed by four resistive impedances or may alternatively include two balancing bridge triodes arranged in full-wave cathode follower relation. Input signal voltage may be impressed directly on the first amplifying bridge or may alternatively be coupled thereto through the balancing bridge.

By inspection of the stabilizing and amplifying electrical structure of the interlocking amplifier, hereinafter described in detail, it will be understood that the differential-midpoint-potential of each amplifying bridge is modulated by and contains a residual distortion component of full-wave-differentially amplified signal voltage, the residual distortion component of differential-midpoint-potential being negative in character and occurring at the second harmonic of signal frequency. It will also be understood that virtual full-wave feedback means exists, within the normal stabilizing structure, amplifying, inverting, and correctively impressing the amplified and inverted residual distortion component of differential-midpoint-potential equally on the control-grids of the pair of bridge-input tubes tending to initiate distortion.

Each component bridge of the interlocking amplifier has first and second input-section impedance arms electrically joined at a negative energizing terminal, and third and fourth load-section impedance arms electrically joined at a positive energizing terminal, opposite differential terminals being respectively formed by the electrical junction of first and third impedance arms and by the electrical junction of second and fourth impedance arms. The bridge input-section is formed by the first and second impedance arms. The bridge load-section is formed by the third and fourth impedance arms. Each bridge has two parallel-connected principal energizing current paths, branches or legs respectively formed by the first and third series-connected impedance arms and by the second and fourth series-connected impedance arms. The two parallel-connected energizing current paths of each component bridge combine to carry the bridge aggregate energizing current and present, along the bridge energizing axis or energizing diagonal, a bridge aggregate impedance or conductance having a bridge energizing voltage drop thereacross and particular thereto, the bridge energizing voltage drop being conveniently regarded as a range of potentials established between the amplifier energizing voltage at the bridge positive energizing terminal and the amplifier energizing voltage at the bridge negative energizing terminal. The bridge aggregate conductance or impedance is a virtual conductance regarded as lying along the bridge energizing axis and equivalent to the parallel-connected conductances of the two current carrying branches of the bridge. The bridge aggregate conductance is comprised of two series-connected conductances respectively taken as the bridge input-section conductance and the bridge load-section conductance, the bridge input-section conductance being a virtual conductance, usually but not restrictively variable, equivalent to the virtually-parallel-connected conductances of the first and second impedance arms of the bridge, and the bridge load-section conductance being a virtual conductance, usually but not restrictively of fixed magnitude, equivalent to the virtually-parallel-connected conductances of the third and fourth arms of the bridge. The bridge input-section conductance has bridge input-section energizing voltage drop thereacross and particular thereto, conveniently regarded as the input-section energizing range-of-potentials taken between the bridge differential-midpoint-potential and the potential at the bridge negative energizing terminal. The bridge load-section conductance has bridge load-section energizing voltage drop thereacross and particular thereto, conveniently regarded as the load-section energizing range-of-potentials taken between the potential at the bridge positive energizing terminal and the bridge differential-midpoint-potential. Opposite differential terminals respectively have potentials particular thereto and a differential diagonal or bridge-cross-diagonal therebetween with differentially variable voltage thereacross, the bridge differential diagonal being usually but not restrictively a virtual diagonal having a differential midpoint with differential-midpoint-potential particular thereto, the differential-midpoint-potential being a virtual potential taken at any instant of time as the instantaneous arithmetic mean of the potentials at opposite differential terminals of the bridge. Bridge balance is defined as the electrical condition existing when, with input signal quiescent, bridge differential voltage is zero.

It is here noted that the input-section and load-section energizing voltage drops of a bridge are not restricted to equality.

Component bridges include a balancing bridge and a plurality of successively-adjacent amplifying bridges arranged in full-wave amplifying sequence, there being an initial or first amplifying bridge, a next-to-last amplifying bridge hereinafter referred to as the compensating bridge, and a final amplifying bridge hereinafter referred to as the output bridge. The output bridge has an output differential load impedance connected between the opposite differential terminals thereof with output differential current flowing therethrough and with output differential voltage thereacross. The output differential load impedance has an output differential load impedance midpoint (M) with potential particular thereto responsive to output-bridge differential-midpoint-potential, responsiveness rather than identity of potentials being specified since it is permissible and sometimes desirable to require a portion of one energizing current to pass through the output-bridge output-differential-load-impedance midpoint.

The balancing bridge is the initial or low potential bridge in the stabilizing sequence of successively-adjacent bridges and is also the initial or low potential bridge of a plurality of successively-contiguous series-connected bridges forming the first energizing current path or the first energizing sequence of bridges respectively polarized by first energizing current. The negative terminal of the balancing bridge is common with the amplifier negative energizing terminal and has amplifier reference potential particular thereto. The balancing bridge combines with the first amplifying bridge to form the initial, first, or input stage of the amplifier and fundamentally provides: a differential-midpoint-potential established by first energizing current and functioning as an initial stabilizing reference potential actuating interresponsive regulation of second energizing current at and through the negative terminal of the initial amplifying bridge thus "voltage regulating" the self-biasing voltage of the first amplifying bridge as generated across a fixed self-biasing resistor (37) by the regulated second energizing current flowing therethrough, the self-biasing resistor being connected between the negative terminal of the first amplifying bridge and the amplifier negative energizing terminal; and differential means responsive to manual complementary adjustment of the balancing-bridge first and second impedance arms for actuating balance of the first amplifying bridge.

The balancing bridge may additionally and desirably function, as in the third and fourth variants of the present invention, to transfer signal voltage from a signal input impedance to the control-grids of the first-amplifying-bridge bridge-input tubes. This additional function may be imposed on the balancing bridge by including therein a pair of balancing-bridge triodes respectively forming the third and fourth impedance arms thereof and arranged in full-wave modified cathode follower relation, the balancing bridge triodes having the anodes thereof energized by common connection to the balancing-bridge positive terminal, having the cathodes thereof respectively connected to opposite differential terminals of the balancing bridge, and having the control-grids thereof respectively connected to opposite ends of the signal input impedance, the signal input impedance being centrally connected to the amplifier negative energizing terminal.

Each amplifying bridge is formed by a pair of input-section bridge-input tubes and a pair of load-section resistive impedances arranged symmetrically in full-wave amplifying relation, the bridge-input-tube cathodes being joined at the negative terminal thereof and imposing an input-section differential voltage node thereat, the pair of load-section resistive impedances being joined at the positive terminal thereof and similarly imposing a load-section differential voltage node thereat, the opposite ends of the load-section resistive impedances respectively constituting opposite differential terminals thereof, the bridge-input-tube anodes being respectively connected to opposite differential terminals thereof, the first and second arm resistive impedances or conductances being respectively variable as comprised in the cathode-to-anode electron paths of the bridge input tubes and respectively responsive to potentials impressed on a pair of controlling electrodes symmetrically positioned in full-wave relation in the pair of bridge-input tubes. The pair of controlling electrodes referred to above may be comprised in the pair of control-grids included in a pair of bridge-input triodes or pentodes, or may alternatively or additionally be comprised in the pair of screen-grids included in a pair of bridge-input pentodes. It is mandatory that the variable conductances respectively forming the first and second input-section arms of each amplifying bridge simultaneously be responsive: respectively and oppositely, in full-wave amplifying relation, to differentially variable signal voltage always impressed on and between the control-grids of the pair of bridge-input tubes; respectively and oppositely, in full-wave balancing relation, to differentially variable balancing voltage impressed on and between the control-grids of the pair of bridge-input tubes or alternatively impressed on and between the screen-grids of the pair of bridge input pentodes; also respectively and equally, in identical or virtually-paralleled stabilizing sense, to the differential-midpoint-potential of the preceding adjacent bridge, normally impressed on the control-grids of the pair of bridge-input triodes or pentodes, or alternatively impressed on the screen-grids of the pair of bridge-input pentodes, as, for example, in the first amplifying bridge of the first and second variants of the present invention. Screen-grids, when included in a pair of bridge-input tubes, are energized by connection, usually but not restrictively through voltage dropping means to potential responsive to the differential-midpoint-potential of the bridge including said screen-grids.

According to the generalized energizing concept, the first amplifying bridge is the second bridge in the stabilizing sequence of successively-adjacent bridges, combines with the balancing bridge to form a first or input stabilized amplifying stage, and, when four or more bridges are employed, is the initial or low potential bridge of a second plurality of successively-contiguous series-connected bridges forming the second energizing current path or the second complementary energizing sequence of bridges respectively polarized by second energizing current. A self-biasing resistor of fixed value (37) is provided and connected between the negative terminal of the first amplifying bridge and the amplifier negative energizing terminal. Current-regulated second energizing current flowing through the self-biasing resistor, in voltage regulating relation, generates an initial amplifier voltage drop or initial-range-of-potentials common to the self-biasing resistor and to the input-section of the balancing bridge. The input-section conductance of the first amplifying bridge, being responsive to the differential-midpoint-potential of the balancing bridge, functions to effect amplified inversion of balancing-bridge differential-midpoint voltages (or changes in the differential-midpoint-potential of the balancing bridge) and causes these amplified and inverted voltages to appear as components of the differential-midpoint-potential of the first amplifying bridge. Sequentially, the variable input-section conductance of the second amplifying bridge, being in like manner responsive to the differential-midpoint-potential of the first amplifying bridge, acts further to control and current-regulate first-energizing-current common to and polarizing both the second amplifying bridge and the balancing bridge thereby interlocking the first and second complementary energizing currents in stabilized and fixed inter-responsive relationship.

It is here noted that the interlocking amplifier is fundamentally a stabilized amplifier employing a minimum number of component tubes consistent with desired high voltage gain and independence from "stray voltages." A minimum of two amplifying stages comprised in three successively-adjacent bridges are required for satisfactory operation, and employment of an even number of component bridges is desirable. The number of component bridges, in contrast with usual practice, may safely be either odd or even. Consequently, it can not be specified, in the general case, whether the output bridge is polarized by first energizing current or by second energizing current. It is only important to specify that the output bridge is polarized by one of the two complementary energizing currents and that the compensating bridge is polarized by the other of the two complementary energizing currents. The current path of the energizing current polarizing the compensating bridge is completed, in series-connection, through a compensating conductance (7) connected between the positive terminal of the compensating bridge and the amplifier positive energizing terminal.

The compensating conductance is comprised, usually but not restrictively, in a compensating triode connected in current-regulating and stabilizing relation, the anode thereof being connected to the amplifier positive energizing terminal, the cathode thereof being connected to the positive terminal of the compensating bridge, the control-grid thereof being connected to the midpoint of the output-differential-load-impedance, and the conductance thereof being responsive to the differential-midpoint-potential of the output bridge. The compensating conductance, as above constituted, is equivalent, in a current-regulating and stabilizing sense, to the input-section conductance of an amplifying bridge, and the cathode terminal (K₄) of the compensating conductance is equivalent, in like sense, to the negative terminal of an amplifying bridge.

Inclusion of the compensating conductance, as above described, completes a consecutive and stabilizing sequence of successively-adjacent amplifying-bridge input-section conductances, alternate bridge-input-section conductances being polarized alternately by first and second energizing currents, and each amplifying-bridge input-section conductance being responsive, in current-regulating relation, to the differential-midpoint-potential of the preceding adjacent bridge, thereby establishing stabilized proportionate division of amplifier energizing voltage into consecutive stabilized ranges-of-potentials. The consecutive stabilized ranges-of-potentials function respectively to polarize the input-section conductance of each component bridge, the range-of-potentials polarizing the input-section of each amplifying bridge being substantially common with or held in fixed relative relation to the range-of-potentials polarizing the load-section of the preceding adjacent bridge.

It will be understood that, when a pair of electronic tubes are arranged in full-wave relation and their control-grids are equally excited in opposite voltage sense by full-wave input signal, unequal changes of plate current normally occur as a result of the inherent non-linearity of the component tubes. These unequal changes of plate current tend to occur in the pair of bridge-input tubes of each amplifying bridge and tend to produce, in each instant bridge, a residual distortion component of differential-midpoint-potential, negative in character and occurring at the second harmonic of signal frequency.

A differentially-nondegenerative virtual feedback path is inherent in the normal electrical structure of the stabilizing sequence of successively-adjacent bridges and involves the instant bridge tending to originate the distortion together with its related following adjacent bridge and its related preceding adjacent bridge. This virtual feedback path correctively functions in the following manner. Responsive to the distortion component of differential-midpoint-potential of the instant bridge, negative in character, the potential at the negative terminal of the following adjacent bridge is lowered. Responsive to the lowered potential at the negeative terminal of said following adjacent bridge, the potential at the positive terminal of the preceding adjacent bridge is lowered. This responsive lowering of the potential at the positive terminal of the preceding adjacent bridge constitutes a corrective voltage occurring at the potential level particular to the positive terminal of said preceding adjacent bridge. This corrective voltage is transferred, through the agency of the energizing voltage drop across the load-section of said preceding adjacent bridge, from the potential level particular to the positive terminal of said preceding adjacent bridge to the potential level of the differential-midpoint-potential of said preceding adjacent bridge where it is impressed equally and correctively in the same voltage sense on each of the pair of control-grids of the bridge-input tubes of the instant bridge tending to originate distortion.

It is noted that correction of distortion is effected in each amplifying bridge as distortion tends to occur, thereby tending to prevent progressive phase shift of amplified signal voltage in the interlocking amplifier. It is also noted that the load-section arms of each bridge, except the output bridge, are included in the successive virtual feedback circuits and that variable conductance in these load-section arms, such as the employment of differential follower triodes therein, functions degeneratively to impair the desired correction of distortion. Accordingly, the load section arms of each amplifying bridge, except the output bridge, should preferably be formed by noninductive resistors or alternatively by resistive impedances. It is further noted that pentodes may favorably be employed as bridge-input tubes by reason of higher gain per amplifying bridge resulting from their use, and, importantly, by reason of the substantial independence of pentode anode current from changes in pentode anode voltage where the control-grid, screen-grid and suppressor-grid potentials thereof are held in fixed relation to the cathode potential thereof, as in the interlocking amplifier.

It will be understood that normal operative changes of amplifier energizing voltage occur. Where triodes are exclusively employed in the amplifier, these changes of amplifier energizing voltage are proportionately distributed throughout the consecutive significant ranges-of-potentials thereof. Where pentodes are employed as bridge-input tubes, operative changes of amplifier energizing voltage desirably tend to be absorbed in the load-section of the output-bridge. Employment of differential-follower triodes in the third and fourth or load-section arms of the output bridge is both permissible and desirable since inclusion thereof provides means increasing the load-section resistive impedance of the output bridge in voltage regulating relation as energizing current therethrough tends to increase.

The foregoing generalized treatment of the interlocking amplifier has outlined and related unusual features of the present invention, and has established useful definitions facilitating its more concise description. This generalized treatment has covered the preferred employment of pentodes or beam amplifier tetrodes as bridge-input tubes, and has also covered the more general case employing electronic triodes in a symmetrical structure applicable, as well, to crystal triodes. In such an application the adverse effects of stray electrical fields and stray mechanical forces occur equally at opposite differential terminals of the symmetrical array, full-wave differentially amplified signal voltage being substantially independent therefrom.

Other and further objects of this invention will be understood from the specification hereinafter following by reference to the accompanying drawings in which:

Fig. 6 is a schematic circuit diagram embodying a four bridge interlocking amplifier employing triodes as bridge-input tubes and including balancing-bridge triodes and output-bridge differential follower triodes, providing, if desired, first and second energizing current paths of equal impedance.

Fig. 7 is a schematic circuit diagram embodying an interlocking amplifier combining the balancing-bridge triodes of Fig. 5 with the employment of pentode bridge-input tubes of Fig. 4.

Fig. 8 is a schematic circuit diagram embodying an interlocking amplifier extending the schematics of Fig. 4 to include a pair of differential follower triodes in the output bridge.

Figure 9:
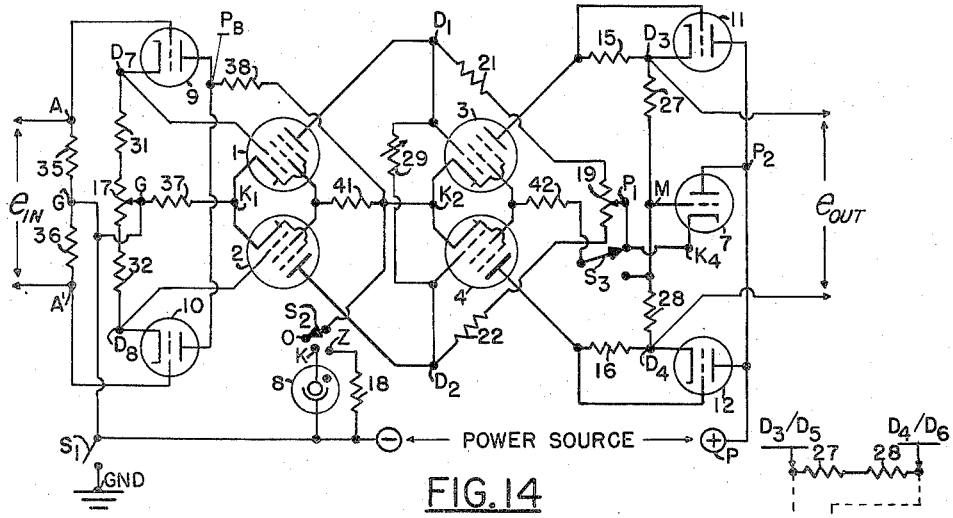

Fig. 9 is a schematic circuit diagram embodying a three bridge interlocking amplifier combining amplifying-bridge bridge-input pentodes with balancing-bridge triodes and with output-bridge differential-follower triodes, further extended to provide alternative selective inclusion of a shunt resistive impedance or a ballast voltage regulator between the amplifier negative energizing terminal and the negative terminal of the output bridge.

Figure 4:
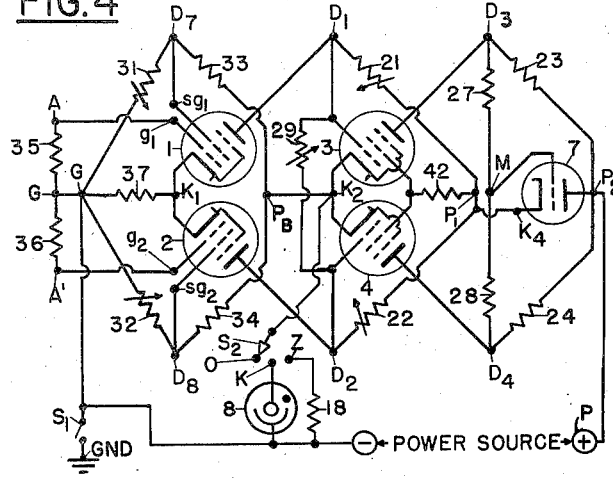
Fig. 4 is a schematic circuit diagram embodying the interlocking amplifier in a three bridge arrangement employing a compensating conductance.
Figure 10:
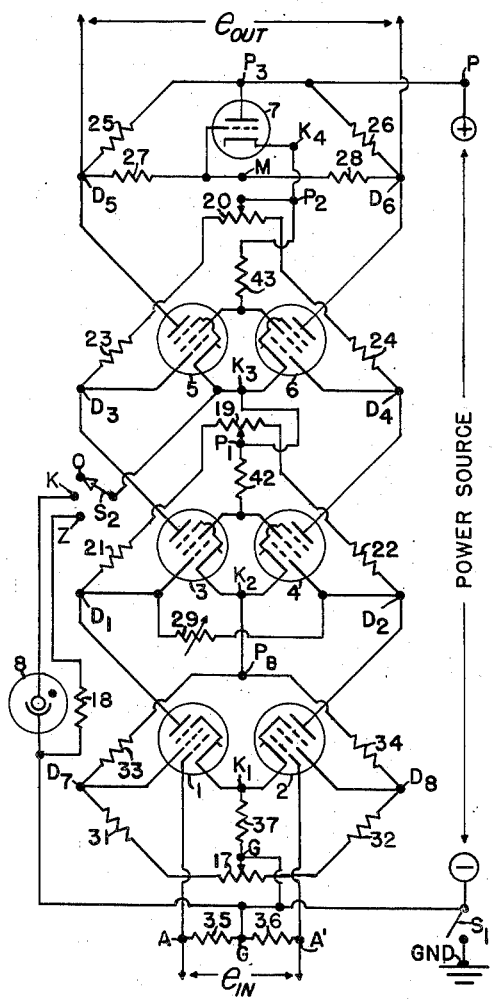

Fig. 10 is a schematic circuit diagram embodying an interlocking amplifier extending the schematics of Fig. 4 to include an odd number of amplifying bridges and further extended to provide optional inclusion, as desired, of a shunt resistive impedance or ballast voltage regulator between the amplifier negative energizing terminal and the negative terminal of the output bridge.

Figure 11:
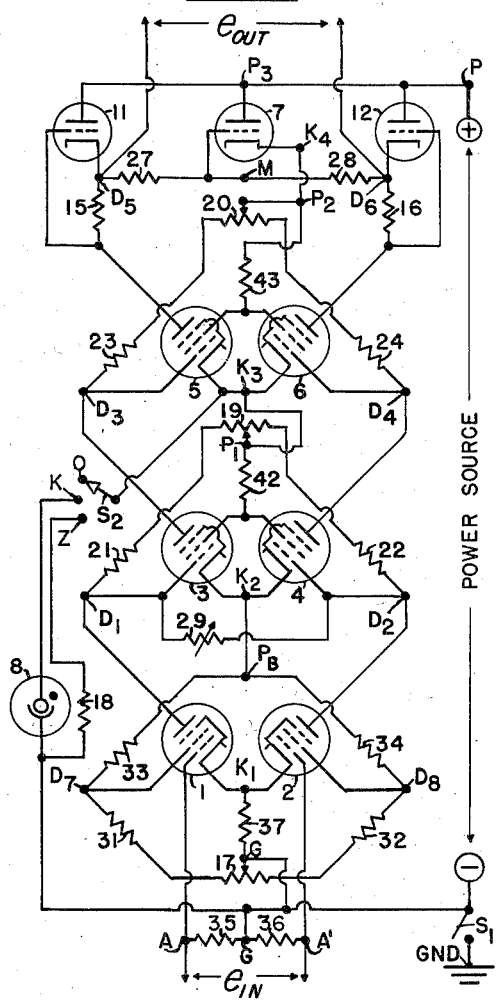

Fig. 11 is a schematic circuit diagram embodying an interlocking amplifier extending the schematics of Fig. 11 to include a pair of differential-follower triodes in the output bridge.

Fig. 12 is a schematic circuit diagram embodying an interlocking amplifier extending the schematics of Fig. 10 to include a stabilizing bridge reducing phase shift resulting from overall transit time of signal voltage.

Fig. 13 is a schematic circuit diagram embodying an interlocking amplifier extending the schematics of Fig. 12 to include a pair of differential-follower triodes in the output bridge.

Figure 14:
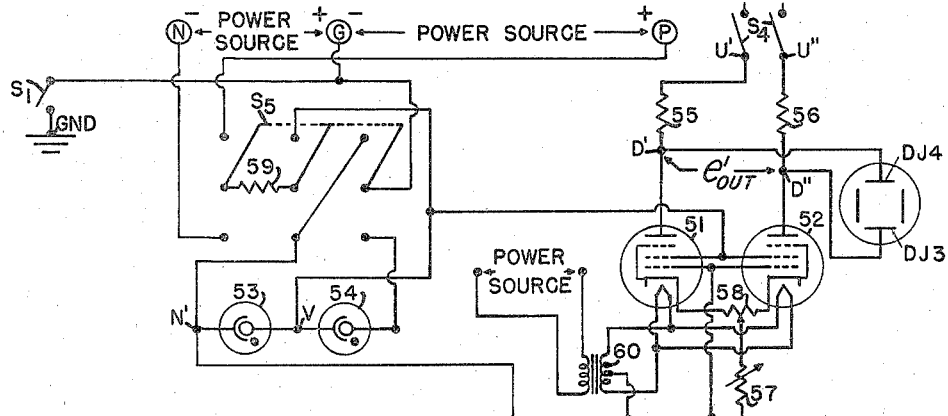

Fig. 14 is a schematic circuit diagram showing voltage dropping pentode means for operational connection to the opposite differential terminals of the output bridge of an interlocking amplifier thereby transferring differentially amplified output signal voltage, as desired, to either of two potential levels.

Figure 15:
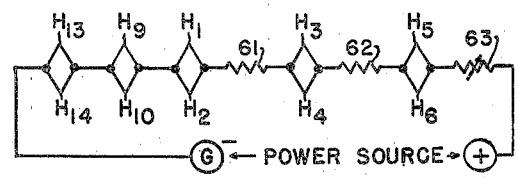
Figure 15A:
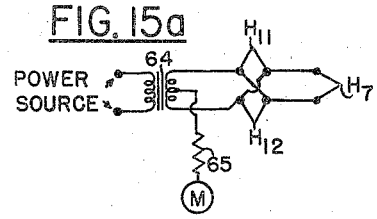

Fig. 15 shows means, but not restrictive means, energizing the heating elements of component tubes of the family of interlocking amplifiers as identified by corresponding subscript notation.

In order that this invention may clearly be understood and readily be placed in effect it will now more fully be described with reference to preferred illustrative embodiments thereof as shown in the several figures wherein like characters refer to like parts or circuit points of like relationship, and wherein switches have been utilized to effect economy of descriptive drawings. In the following descriptions, advantage is taken of the generalized electrical structures, relationships and definitions hereinbefore set forth.

Figure 1:
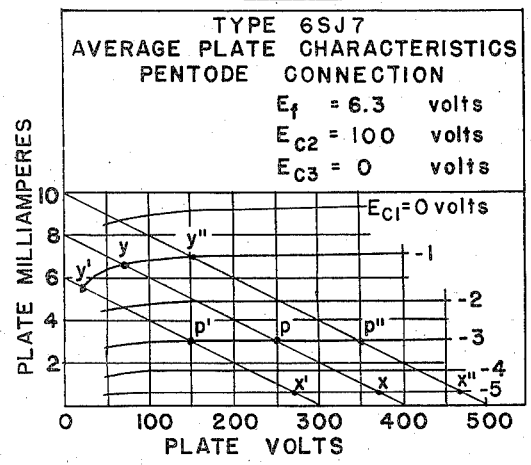
Fig. 1 shows the average plate characteristics of a type 6SJ7 or 12SJ7 electronic tube.

Referring now to Fig. 1, inspection of the average plate characteristics of a type 6SJ7 or 12SJ7 electronic tube, in pentode connection, shows that with the cathode, control-grid, screen-grid and suppressor-grid held at fixed relative potentials, the plate or anode current thereof is substantially independent of plate or anode voltage. Three characteristic 50,000 ohm load lines are shown; $xpy$, $x'p'y'$ and $x''p''y''$, related respectively to plate supply voltages of 400 volts, 300 volts and 500 volts. Inspection of these load lines shows that with the cathode, control-grid, screen-grid and suppressor-grid held at fixed relative potentials and with convenient reference to a control-grid voltage of $-3$ volts, as at points $p$, $p'$ and $p''$, the voltage drop across the plate load resistor remains substantially constant as plate supply voltage is varied minus and plus 100 volts centering on a "designed" plate supply voltage of 400 volts. This characteristic may advantageously be utilized to effect transfer of signal or similar voltage with substantial exactness from a higher to a lower potential level as for instance from the potential level at the positive plate voltage supply terminal to the lower potential level at any point on the plate load resistor particularly including the pentode anode terminal.

Further inspection of a normal operative load line $xpy$ also shows that with equal and opposite excitation of the control-grid taken with respect to control-grid voltage at operating point $p$, substantially disproportionate increments of plate load voltage result, as at $x$ and $y$, and constitute distortion, this distortion being common to all electronic tubes.

Figure 2:
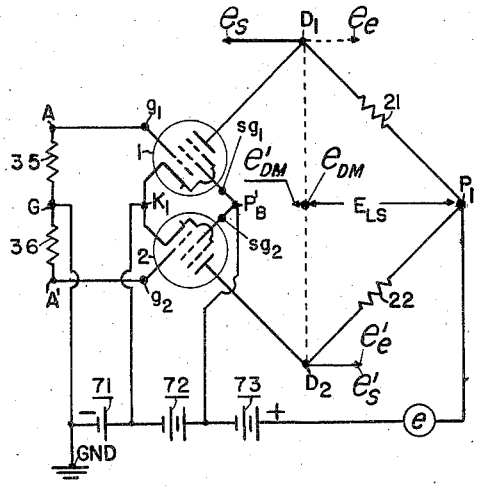
Fig. 2 is a schematic circuit diagram of a conventional full-wave amplifying array showing the presence of a virtual differential diagonal and a virtual differential-midpoint-potential.

Referring now to Fig. 2, a conventional full-wave first or input amplifying bridge is shown employing a pair of bridge-input pentodes having average plate characteristics similar to those shown in Fig. 1, the bridge-input pentodes being respectively identified by circuit characters 1 and 2. Circuit character G indicates the negative energizing terminal of an amplifier having a plurality of amplifying bridges including a first amplifying bridge. Circuit character G has amplifier reference potential particular thereto. Circuit character GND indicates connection to ground potential as desired. Circuit characters 71, 72 and 73 respectively indicate series-connected battery sections providing fixed relative potentials at circuit points G, $K_1$, $P_B'$ and $P_1$, battery section 71 being a biasing battery having the negative terminal connected to G and the positive terminal connected to $K_1$, battery section 72 being a screen-grid supply voltage battery having the negative terminal connected to $K_1$ and the positive terminal connected to $P_B'$, and series-connected battery sections 72 and 73 forming a plate-supply-voltage battery with the positive terminal thereof connected to $P_1$. Circuit character $e$ indicates a variable error voltage introduced for purposes of discussion and modulating the plate supply voltage. Circuit characters 35 and 36 respectively indicate equal halves of a resistive signal input impedance connected between signal input terminals A and A′, the signal input impedance being centrally connected to circuit point G, and terminals A, G and A′ providing input connections responsive to full-wave or to half-wave signal input as desired. Circuit characters $K_1$ and $P_1$ respectively indicate the negative and positive energizing terminals of the first amplifying bridge, each with potential and amplifier energizing voltage particular thereto, and with a constructive or virtual energizing axis or energizing diagonal therebetween. Circuit characters 21 and 22 respectively indicate two equal load-section resistors or resistive impedances respectively forming the third and fourth arms or load-section arms of the first amplifying bridge, each with one end thereof energized by connection to $P_1$, the respective opposite ends thereof respectively constituting opposite differential terminals $D_1$ and $D_2$ of the first amplifying bridge. Opposite differential terminals respectively have time-variable potentials particular thereto, and have a constructive or virtual differential diagonal or cross-diagonal therebetween with differentially-variable voltage thereacross. Bridge-input pentodes 1 and 2 respectively have control-grid terminals $g_1$ and $g_2$ respectively connected to A and A′, respectively have screen-grid terminals $sg_1$ and $sg_2$ here joined by energizing connection to circuit point $P_B'$, respectively have the cathodes and suppressor-grids thereof electrically joined by common connection to circuit point $K_1$, and respectively have the anodes thereof energized by respective connection to opposite differential terminals $D_1$ and $D_2$. The respective cathode-to-anode electron paths of pentodes 1 and 2 respectively constitute conductances or resistive impedances respectively forming the first and second arms or input-section arms of the bridge. The above recitation of bridge structure defines connection of a pair of bridge-input tubes and a pair of load-section impedances in full-wave or full-wave-differential relation.

The bridge differential diagonal is illustrated by dotted line $\overline{D_1\ e_{DM}\ D_2}$ and may be virtual or real depending on whether the impedance thereof is infinite or finite. A differential-midpoint-potential, identified by circuit character $e_{DM}$, exists at the midpoint of a differential diagonal of infinite impedance, is usually virtual in character, and has been defined as the arithmetic mean, at any instant of time, of the instantaneous potentials at opposite differential terminals of the bridge. The differential-midpoint-potential of a bridge may be made real by providing a differential-load-impedance of finite magnitude and by restricting the current flowing therethrough to differential current only. Where a differential-load-impedance of finite magnitude is provided and the electrical midpoint M thereof is connected through an auxiliary or secondary current path to lower potential, identity of the potential at M with differential-midpoint-potential ceases but the potential at differential-midpoint M importantly continues responsive to differential-midpoint-potential $e_{DM}$.

The first amplifying bridge has two principal parallel-connected current-carrying branches respectively formed by the series-connected conductances of pentode 1 and circuit element 21 and by the series-connected conductances of pentode 2 and circuit element 22. The two parallel-connected principal energizing current paths of the first amplifying bridge combine to carry the bridge aggregate energizing current and present along the bridge energizing axis a bridge aggregate conductance or resistive impedance having the bridge energizing voltage drop thereacross and particular thereto. The bridge aggregate conductance comprises two series-connected virtual conductances respectively taken as the bridge input-section conductance and the bridge load-section conductance, the bridge input-section conductance being variable and formed by the virtually-parallel-connected conductances of pentodes 1 and 2, and the bridge load-section conductance being fixed and formed by the virtually-parallel-connected conductances of circuit elements 21 and 22. The bridge input-section conductance has bridge input-section energizing voltage drop thereacross and particular thereto, taken between the bridge differential-midpoint-potential and the potential at the negative terminal of the bridge and conveniently regarded as the input-section range-of-potentials. The bridge load-section conductance has bridge load-section energizing voltage drop thereacross and particular thereto, taken between the potential at the bridge positive energizing terminal and the differential-midpoint-potential of the bridge.

Established art conventionally assumes a vacuum tube amplifier to be operationally linear when the plate load impedance is restricted to pure resistance and the amplifier is excited by small signal voltages.

With input signal quiescent, the control-grids, screen-grids, suppressor-grids and cathodes of pentodes 1 and 2 are held at fixed relative potentials and the anode currents of pentodes 1 and 2 respectively flowing through opposite differential terminals $D_1$ and $D_2$ are substantially constant in magnitude, being substantially and importantly independent from changes in the input-section energizing voltage drop, thereby providing a load-section energizing voltage drop or load-section range of potentials of substantially fixed magnitude as error voltage $e$ assumes significant variable values. Accordingly and with respect to an error voltage component appearing at the bridge positive terminal, the full-wave-differential bridge importantly provides pentode means transferring a said error voltage component from the potential level at said bridge positive terminal to the respective potential levels at said opposite differential terminals causing said error voltage component to appear in identical voltage polarity sense and substantially without loss of magnitude at both said opposite differential terminals and to be identically contained as a component of the bridge differential-midpoint-potential. Illustrative of the operative character of the above pentode means, circuit characters $e_e$ and $e_e'$ respectively indicate equal error voltage component vectors respectively particular to $D_1$ and $D_2$ and responsive in identical magnitude to error voltage component $e$, conveniently assumed to be positive in character. It is here observed that the load-section energizing voltage drop or range-of-potentials of a full-wave-differential bridge employing bridge-input pentodes is characterized by and possesses substantial "rigidity," and it is further observed that the input-section energizing voltage drop or range-of-potentials of such a bridge conversely is characterized by and possesses substantial "flexibility," changes in bridge energizing voltage drop tending to be absorbed in the input section.

With signal input restricted to a full-wave signal voltage symmetrical with respect to amplifier reference potential at circuit point G and also restricted to very small magnitudes within the limits of conventional linearity and consistent with the operative character of the first amplifying bridge as included in a plurality of bridges forming an amplifier of high voltage gain, increments of anode current, equal in magnitude, opposite in phase and responsive to signal voltage, occur respectively in pentodes 1 and 2. These increments of anode current respectively flowing through circuit elements 21 and 22 generate respectively thereacross amplified signal voltage drops respectively appearing at opposite differential terminals $D_1$ and $D_2$ as full-wave-differentially-related amplified signal voltages, hereinafter conveniently referred to as differentially amplified signal voltage generated between said opposite differential terminals. The differentially amplified signal voltage occurs in phase with input signal and at a variable potential level as error voltage $e$ varies, and the magnitude of differentially amplified signal voltage is substantially independent from variation of error voltage $e$.

Anticipating amplification in subsequent bridges of a high gain amplifier where larger signal voltages exist and the conventional assumption of linearity ceases to be factual as established by inspection of Fig. 1, circuit characters $e_s$ and $e_s'$ respectively and vectorially indicate unequal amplified signal voltages respectively appearing at $D_1$ and $D_2$ responsive to excitation by symmetrical full-wave signal voltage conveniently taken at an instant of time when it is positive at A. These unequal amplified signal voltages, vectorially shown at $D_1$ and $D_2$, constitute distortion of differentially amplified signal voltage resulting from the inherent distortion present in all electronic tubes and generate a distortion component of differential-midpoint-potential indicated vectorially by circuit character $e_{DM}'$, the distortion component of differential-midpoint-potential being negative in character and occurring at the second harmonic of input signal frequency.

Circuit character $E_{LS}$ indicates the load-section energizing voltage drop or load-section range of potentials of the bridge.

Figure 3:
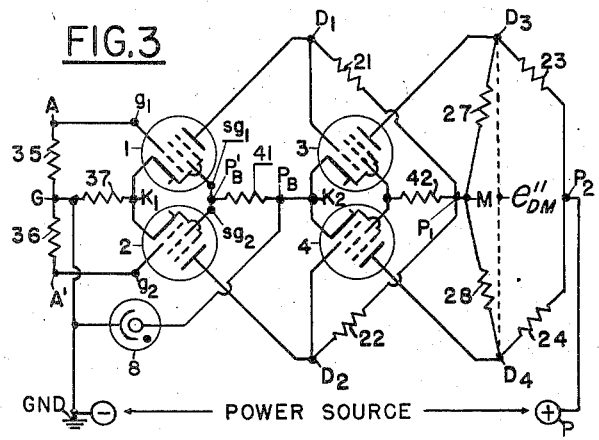
Fig. 3 is a schematic circuit diagram establishing stabilizing and nondegenerative virtual feedback relationships between two amplifying bridges.

Referring now to Fig. 3, the characteristics inherent in the full-wave-differential amplifying bridge structure of Fig. 2 are utilized and extended in a two bridge structure; to provide stabilizing voltage-regulated proportionate division of amplifier energizing voltage, to provide an interlocking "shared" range-of-potentials, and to provide nondegenerative virtual feedback means correcting distortion. Previously identified circuit characters remain effective.

Circuit character P indicates the positive energizing terminal of the amplifier and a power source is indicated connected between P and G. Circuit characters $K_2$ and $P_2$ respectively indicate the negative and positive energizing terminals of the second amplifying bridge and circuit characters $D_3$ and $D_4$ respectively indicate opposite differential terminals of the second amplifying bridge, $P_2$ being energized by connection to P. Circuit characters 23 and 24 respectively indicate nominally equal resistors or resistive impedances respectively forming the third and fourth or load-section arms of the second amplifying bridge, each being energized by connection of one end thereof to $P_2$, the opposite ends thereof respectively constituting opposite differential terminals $D_3$ and $D_4$. Dotted line $\overline{D_3\ e_{DM}''\ D_4}$ indicates the differential diagonal of the second amplifying bridge having the differential-midpoint-potential $e_{DM}''$ of the second amplifying bridge particular thereto. Circuit characters 27 and 28 respectively indicate two equal resistors or resistive-impedances, series-connected at circuit point M to form the output-bridge output-differential-load-impedance and with opposite ends thereof here connected between opposite differential terminals $D_3$ and $D_4$, the second amplifying bridge of Fig. 3 being an output bridge, and circuit point M being the output-differential-load-impedance midpoint and having potential particular thereto. It is here observed that the potential at M is responsive to, but not identical with, differential-midpoint-potential $e_{DM}''$ by reason of energizing voltage drops through circuit elements 27 and 28. Circuit characters 3 and 4 respectively indicate bridge-input pentodes of the second amplifying bridge with the respective cathodes and suppressor-grids thereof electrically joined by respective connection to $K_2$, with the control-grids thereof respectively excited by respective connection to $D_1$ and $D_2$, with the screen-grids thereof electrically joined at a common connection and energized by further connection through voltage dropping resistor 42 to $P_1$, with the anodes thereof respectively connected to $D_3$ and $D_4$, and with the cathode-to-anode electron paths thereof respectively forming the first and second or input-section arms of the second amplifying bridge.

Circuit character 37 indicates a fixed self-biasing resistor connected between $K_1$ and G, the voltage-drop thereacross replacing battery section 71. The common connection of screen-grid terminals $sg_1$ and $sg_2$ at circuit point $P_B'$ continues effective. Circuit character $P_B$ indicates a circuit point energized by connection to the negative terminal $K_2$ of the second amplifying bridge. The selection of characters anticipates the subsequent employment of $P_B$ as the positive energizing terminal of the balancing bridge of all remaining figures. The screen-grids of pentodes 1 and 2 are energized by connection of $P_B'$ through voltage dropping resistor 41 to $P_B$.

Circuit character 8 indicates a gaseous voltage regulator tube with the cathode thereof connected to G and with the anode thereof connected to the negative terminal of the output bridge as at $K_2$. The device schematically indicated by circuit character 8 functions as a ballast regulator holding the voltage at the negative terminal of the output bridge constant as current through said output-bridge negative terminal varies or exceeds circuit requirements at lower potential as, for instance, incidental to employment of the output bridge as a power amplifier, or incidental to correction of distortion, or incidental to effecting variation of the load-section voltage drop of the output bridge in voltage regulating relation. Accordingly, circuit character 8 may alternatively and advantageously be taken to indicate the low potential section of my electronic voltage regulator, filed separately on January 29, 1952, as Serial No. 268,725, with terminals G and K thereof respectively and operatively connected to G and $K_2$ (or later herein to $K_3$) of the present family of amplifiers.

Before proceeding to an analysis of essential operating characteristics of the amplifier of Fig. 3, it is observed that when pentodes or beam power tetrodes are employed as bridge input tubes the cathode currents respectively flowing through $K_1$ and $K_2$ respectively exceed the aggregate energizing currents respectively polarizing the first and second amplifying bridges. A distinction between bridge aggregate energizing current and bridge cathode current is warranted and desirable since the screen-grid current of an instant bridge is regarded as an auxiliary or enabling current responsive to the differential-midpoint-potential of said instant bridge, whereas said differential-midpoint-potential of said instant bridge is principally determined by said bridge aggregate energizing current flowing through the third and fourth arms of said instant bridge.

For purposes of analysis and limited to Fig. 3, it is assumed that symmetrically arranged complementary circuit elements possess identical characteristics or magnitudes and that all bridges "balance" without requiring manual adjustment.

With input signal quiescent, the control-grids, screen-grids, suppressor-grids and cathodes of pentodes 1 and 2 are held at fixed relative potentials, and $K_2$ is held, by ballast regulator 8, at a fixed potential above amplifier reference potential at G. The anode currents of pentodes 1 and 2 are equal, constant in magnitude, and substantially independent from variations of potential at $P_1$, and the first amplifying bridge aggregate energizing current, defined herein as second energizing current, is substantially constant in magnitude. The voltage drops respectively generated across circuit elements 21 and 22 being equal, potentials of identical magnitude respectively appear at opposite differential terminals $D_1$ and $D_2$.

The respective potentials at $D_1$ and $D_2$, taken with respect to potential at $K_2$, establish control-grid voltages respectively controlling the variable conductances, anode currents, screen-grid currents and cathode currents of pentodes 3 and 4.

The cathode currents of pentodes 3 and 4, being algebraically integrated by the common connection of the cathodes thereof to $K_2$, provide a real second-amplifying-bridge cathode current responsive to the virtual differential-midpoint-potential of the first amplifying bridge. It is here importantly noted that the energizing series-connection of alternate bridges of the family of interlocking amplifiers provides for each amplifying bridge a biasing resistive-impedance path, usually complex in nature, connecting the negative terminal of each instant amplifying bridge to the amplifier negative energizing terminal G. Responsive to the related differential-midpoint-potential of the preceding adjacent bridge, the bridge cathode current of each instant amplifying bridge, flowing through its related biasing resistive-impedance path, generates thereacross a stabilizing voltage, degenerative in character, opposing change of said bridge cathode current and opposing causative change of said related differential-midpoint-potential. It is also noted that, because of the intentional omission of a balancing bridge, ballast regulator 8 has been utilized in Fig. 3 to hold the biasing voltage at $K_2$ constant for purposes of discussion.

Responsive to the control-grid voltages established by potentials appearing at opposite differential terminals $D_1$ and $D_2$, the anode currents of pentodes 3 and 4 respectively flowing through load-section circuit elements 23 and 24 respectively generate thereacross amplified and inverted variable voltage drops with resultant variable potentials respectively appearing at opposite differential terminals $D_3$ and $D_4$ and with resultant differentially-variable output voltage appearing therebetween. Also responsive to changes or increments of the differential-midpoint-potential of the first amplifying bridge, the differential-midpoint-potential of the second amplifying bridge contains amplified and inverted changes or increments of potential. Varying with and responsive to the differential-midpoint-potential of the second amplifying bridge, the potentials at circuit points M and $P_1$ contain an amplified and inverted stabilizing voltage component. This stabilizing voltage component is transferred by the substantially-constant-anode-current-means of pentodes 1 and 2 from the potential level of $P_1$ to the potential level of the differential-midpoint-potential of the first amplifying bridge and appears in identical magnitude and in identical polarity sense at the control-grids of pentodes 3 and 4 as a stabilizing component of the respective control-grid voltages thereof. It is now observed that each pair of bridge-input tubes, as herein connected, is capable of operation in a parallel or virtually-parallel sense herein referred to as operation in a stabilizing sense or stabilizing operation, and also herein referred to as operation in a compensating sense or compensating operation. With the bridge-input tubes of the second amplifying bridge operating in a stabilizing sense and responsively to the above stabilizing component of control-grid voltage impressed equally on the control-grids thereof, the inherently "flexible" input-section energizing voltage drop of the second amplifying bridge varies in accommodation of the magnitude thereof to the magnitude of the substantially "rigid" load-section energizing voltage drop of the first amplifying bridge thereby substantially interlocking the input-section range-of-potentials of the second amplifying bridge with the load-section range-of-potentials of the first amplifying bridge, and further thereby stabilizing the range-of-potentials between the differential-midpoint-potentials respectively of the adjacent first and second amplifying bridges. Additionally, the anode currents of pentodes 3 and 4 are equally responsive, in stabilizing sense and in voltage regulating relation, to changes in the differential-midpoint-potential of the second amplifying bridge occasioned by variation of amplifier power supply voltage thereby effecting voltage regulation of the differential-midpoint-potential of the second amplifying bridge by absorbing changes in amplifier power supply voltage in the load-section energizing voltage drop of the output bridge.

With input signal restricted to a full-wave voltage symmetrical with respect to amplifier reference potential at G, and with the magnitude of input signal voltage further restricted within limits producing "conventionally-linear" equal and opposite increments of anode current respectively in pentodes 3 and 4, amplified and inverted voltage drops of equal magnitude occur in full-wave-relation respectively across circuit elements 21 and 22, and further amplified and reinverted voltage drops of equal magnitude occur in full-wave-relation respectively across circuit elements 23 and 24, the differential-midpoint-potentials respectively of the first and second amplifying bridges being unaffected by input signal restricted as above, and the amplified full-wave differential voltages respectively appearing between opposite differential terminals $D_1$ and $D_2$ and between opposite differential terminals $D_3$ and $D_4$ respectively occurring at variable potential levels but with substantial independence of the respective magnitudes thereof from changes in the amplifier power supply voltage. Factually linear operation based on conventional assumptions is limited to a tendency only and ceases when amplified signal voltage attains measurable magnitude.

With the magnitude of full-wave input signal voltage accordingly held only within the amplifying capabilities of component tubes, responsively thereto, residually unequal changes of potential occur respectively at opposite differential terminals of each amplifying bridge as previously described in the discussion of Fig. 2. These unequal changes of potential, varying with time, constitute amplified signal voltages containing residual distortion components and combine, in each amplifying bridge, to provide amplified and variable differential voltage also containing a residual distortion voltage component. Coexistent with and proportional to the residual distortion component of amplified differential voltage, the differential-midpoint-potential of each amplifying bridge includes a residual distortion component of differential-midpoint-potential which, varying with time, constitutes a distortion voltage component of differential-midpoint-potential occurring at the potential level of and modulating the differential-midpoint-potential. The distortion components of differential voltage and of differential-midpoint-potential are inherently reduced to residual proportions as exemplified by analysis of reduction of distortion tending to occur in the second amplifying bridge of Fig. 3. Here the potential at M and $P_1$ is held in fixed relation to the differential-midpoint-potential of the second amplifying bridge by the substantially constant magnitude of energizing current flowing through M and $P_1$. Accordingly, the distortion voltage component of differential-midpoint-potential of the second amplifying bridge appears identically at M, $P_1$, $D_1$, and $D_2$ and respectively at the control-grids of pentodes 3 and 4, thereat actuating amplified inversion thereof and thereby opposing inequality of the magnitudes of amplified signal voltages respectively appearing at opposite differential terminals $D_3$ and $D_4$, thus reducing the distortion component of amplified differential voltage to residual and negligible proportions. It is importantly observed that this correction of distortion is nondegenerative in character as taken with respect to differentially amplified signal voltage. It is also observed that the electrical structure of Fig. 3, while operable in accordance with the theory of the interlocking amplifier, has been chosen to provide transitional relative simplicity of explanation: specifically, the excessive voltage drops respectively generated across circuit elements 23 and 24 by combined passage of both first and second complementary energizing currents therethrough are undesirable and may be avoided.

Referring now to Fig. 4, a three-bridge embodiment of the interlocking amplifier is shown, extending the schematics of Fig. 3 to include a compensating conductance, a balancing bridge, means effecting balance of component bridges and means controlling amplifier voltage again. Except as herein noted, previous electrical connections relating the functions of circuit elements remain effective.

Circuit character $S_1$ indicates a switch providing optional connection of G to ground potential GND as desired.

Circuit character $S_2$ indicates a three-position selector switch having three selector terminals respectively indicated by circuit characters O, K and Z and having the moveable selector arm thereof connected to the negative terminal of the output bridge, selector position O providing an open-circuited position for employment when the amplifier is supplied by a voltage-regulated power source, ballast regulator 8 or its previously described improved equivalent being connected between selector terminal K and G thereby providing, as desired, means effecting voltage regulation within the amplifier array at circuit point M and thus providing an amplifier of constant differential-voltage gain, circuit character 18 indicating a shunt resistor or resistive impedance connected between selector terminal Z and G thereby providing means, as desired, shunting excess energizing current of the output bridge to G, the excess energizing current of the output bridge being incidental to desired power amplification.

Circuit character 7 indicates a triode functioning as a variable compensating conductance, energized by connection of the anode thereof to P, excited by connection of the control-grid thereof to M, having a cathode terminal $K_4$ connected to the positive energizing terminal of the compensating bridge as at $P_1$ (or as later herein to $P_2$ of a four-bridge embodiment), the previous direct connection of $P_1$ to M having been removed.

Circuit characters $P_B$ and G respectively indicate the positive and negative energizing terminals of the balancing bridge. Circuit characters 31 and 32 respectively indicate nominally equal resistors or resistive impedances respectively forming the first and second or input-section arms of the balancing bridge, each of the input-section arms of the balancing bridge having a manually variable portion, balance of the first amplifying bridge being effected by complementary manual adjustment of the variable portions of circuit elements 31 and 32 without disturbing the magnitude of balancing-bridge input-section impedance as, for instance, by employment of a potentiometer to provide the variable portions of circuit elements 31 and 32. Circuit characters 33 and 34 respectively indicate two nominally-equal voltage-dropping resistors or resistive impedances respectively forming the third and fourth or load-section arms of the balancing bridge. Circuit characters $D_7$ and $D_8$ respectively indicate opposite differential terminals of the balancing bridge with screen-grid terminals $sg_1$ and $sg_2$ respectively connected thereto, voltage-dropping resistor 41 and the common connection of screen-grid terminals $sg_1$ and $sg_2$ to $P_B'$ having been removed.

It is now observed: that the balancing bridge and the second amplifying bridge are energized in series-connection; that the balancing bridge provides a biasing impedance connected between $K_2$ and G; and that, with input signal voltage quiescent, responsive to suitable complementary adjustment of circuit elements 31 and 32 the differential voltage of the balancing bridge controls the variable conductances of pentodes 1 and 2, in full-wave relation, to produce equality of anode currents in the first amplifying bridge.

Circuit elements 21 and 22 are here shown as having variable portions and it is observed that suitable complementary manual adjustment of circuit elements 21 and 22, with input signal voltage quiescent, provides equality of energizing voltage-drops across the load-section arms of the first amplifying bridge, the anode currents of the first amplifying bridge having been adjusted to equality as previously described.

Circuit character 29 indicates a variable resistor connected between opposite differential terminals $D_1$ and $D_2$ and functioning to control the overall voltage gain of the amplifier by controlling the voltage gain of the first amplifying bridge. It will be understood that with suitable adjustment of circuit elements 31 and 32 and of circuit elements 21 and 22, as previously described, amplifier voltage gain may be varied as desired without disturbing amplifier balance.

In an interlocking amplifier a particular amplifying bridge, energized by one of the two complementary energizing currents, is selected for consideration and is hereinafter referred to as an instant bridge. Two contiguous bridges, energized in series-connection by the other of the two complementary energizing currents and respectively operating at higher and lower potentials, are respectively and interresponsively connected to the instant bridge to form a stabilizing sequence of three successively-adjacent bridges, the bridge operating at said higher potential being hereinafter referred to as the superior bridge, the bridge operating at said lower potential being hereinafter referred to as the inferior bridge, and the range-of-potentials taken between the potentials respectively at the positive and negative terminals of the instant bridge being held in fixed relation to, and, in major degree, common with the range-of-potentials taken between the potentials respectively at the positive and negative terminals of the instant bridge being held in fixed relation to, and, in major degree, common with the range-of-potentials taken between the differential-midpoint-potential of the superior bridge and the differential-midpoint potential of the inferior bridge.

For example, it is observed with respect to the three-bridge amplifier of Fig. 4: that the balancing bridge and the second amplifying bridge are energized in series-connection by a first energizing current and constitute contiguous bridges; that the balancing bridge constitutes a biasing impedance connected between $K_2$ and G; that self-biasing resistor 37, the first amplifying bridge and compensating conductance 7 are energized in series-connection by a second energizing current; that self-biasing resistor 37 constitutes a biasing impedance connected between $K_1$ and G; that self-biasing resistor 37 and the first amplifying bridge, in series-connection, constitute a biasing impedance connected between $K_4$ and G; that the second energizing current, here principally controlled by variable conductance 7, is responsive, in stabilizing, current-regulating or cathode follower relation, to the differential-midpoint-potential of the output bridge as here established at circuit point M by the first energizing current, the amplifier voltage at $K_4$ and $P_1$ being thereby held in fixed relation to potential at M; that second energizing current, also controlled by the variable input-section conductance of the first amplifying bridge, is additionally responsive, in stabilizing, current-regulating or cathode follower relation, to the differential-midpoint-potential of the balancing bridge, the amplifier voltage at $K_1$ being thereby held in fixed relation to the differential-midpoint potential of the balancing bridge as established by the first energizing current; that the first energizing current, here principally controlled by the variable input-section conductance of the second amplifying bridge, is responsive, in stabilizing, current-regulating or cathode follower relation, to the differential-midpoint-potential of the first amplifying bridge, the amplifier voltage at $K_2$, as established by first energizing current, thereby being held in fixed relation to the differential-midpoint-potential of the first amplifying bridge as established by the second energizing current.

Accordingly, and with continued reference to the three-bridge amplifier of Fig. 4, it is observed that, with the power source voltage-regulated, the ballast regulator inoperative and input signal voltage quiescent, the first and second energizing currents, in progressive cross-responsive-connection, respectively attained interrelated and stabilized current magnitudes respectively and alternately generating successive bridge-load-section voltage-drops and successive bridge-differential-midpoint-potentials respectively acting in control of the variable compensating conductance and of the variable input-section conductances of component amplifying bridges, mutually satisfying the operating characteristics of component tubes and circuit constants thereby establishing a cascade of successive stabilized ranges-of-potentials in which each bridge-load-section voltage-drop, as generated by one energizing current, is held in fixed relation to, interlocked and, in principle, common with a corresponding dependent bridge-input-section voltage-drop or, more exactly, range-of-potentials generated by the other complementary energizing current, the compensating conductance and the voltage-drop across the compensating conductance being respectively equivalent in this (stabilizing) respect to a bridge-input-section conductance and to the voltage-drop thereacross. It will be understood that the establishment of a cascade of successive ranges-of-potentials, as described above, constitutes stabilized proportionate division of amplifier energizing voltage.

Also, with continued reference to the three-bridge amplifier of Fig. 4, it is observed that, with input signal voltage quiescent, the ballast regulator activated, and the power source voltage permitted to vary within reasonable limits, the amplifier array additionally functions in stabilizing relation to effect voltage regulation of the differential-midpoint-potential of the output bridge thereby providing an amplifier of constant differential-voltage gain.

In a typical amplifying bridge, the bridge cathode current thereof, at any instant of time, is the algebraic summation of the cathode currents of the pair of bridge-input tubes incorporated therein and includes a stabilizing component of bridge-cathode current of substantially constant magnitude and also includes two increments of anode current respectively responsive to full-wave signal excitation and varying in opposite phase, the bridge cathode current of a typical amplifying bridge taken as an instant bridge thereby being responsive to the differential-midpoint-potential of its related inferior bridge regardless of whether said differential-midpoint-potential be real or virtual.

Finally, with continued reference to the three-bridge amplifier of Fig. 4, with full-wave signal voltage impressed on and between signal input terminals A and A' and with either the power source voltage-regulated or the ballast regulator activated, the inherent non-linearity of each component pair of bridge-input tubes tends to produce distortion of differentially-amplified signal voltage thereby tending to modulate the differential-midpoint-potential of each amplifying bridge in a manner previously described in the discussion of Fig. 2. This modulation of the differential-midpoint-potential of an amplifying bridge constitutes a residual distortion component of the differential-midpoint-potential of said amplifying bridge. Differentially-nondegenerative virtual-feedback means reducing both distortion and progressive phase-shift of amplified signal voltage to negligible residual proportions is inherent in the electrical structure of any three successively adjacent bridges of an interlocking amplifier according to this invention and is also inherent in the combined electrical structure of the output bridge taken as an instant bridge, the compensating bridge taken as a related enabling inferior bridge, and the compensating conductance. For example, responsive to signal excitation, the residual distortion component of differential-midpoint-potential of the output bridge actuates modulation of the cathode current of the compensating conductance thereby modulating the amplifier voltage at $K_4$ and at the positive terminal of the compensating bridge as at $P_1$ of Fig. 4 (or later herein as at $P_2$ of a four-bridge amplifier). This modulation component of amplifier voltage at $K_4$ and at the positive terminal of the compensating bridge occurs in phase with the residual distortion-component of output-bridge differential-midpoint-potential and is transferred equally and in identical phase to both control-grids of the pair of output-bridge bridge-input tubes, said transfer being effected, substantially without loss of transit time, respectively across both load-section arms of the compensating bridge by the enabling pentode transfer-means of the pair of bridge-input pentodes of the compensating bridge. The residual distortion-component of output-bridge differential-midpoint-potential thus transferred from circuit point M respectively to the control-grids of the pair of output-bridge bridge-input tubes establishes thereat respective and corrective components of control-grid voltage respectively actuating amplified inversions thereof respectively appearing at the opposite differential terminals of the output bridge, said amplified inversions being substantially equal in magnitude, of identical phase and opposite in phase to the causative residual distortion-component of output-bridge differential-midpoint-potential thereby reducing said causative distortion-component of output-bridge differential-midpoint-potential to residual negligible proportions. Since the inherent source of distortion resides in unequal increments of anode current occurring respectively in opposite phase in the two "opposite" branches of the output bridge, said corrective amplified inversion is degenerative in the branch carrying the greater increment of anode current, said corrective amplified inversion is regenerative in the opposite branch carrying the smaller increment of anode current, and the combined correctional effect, taken between the opposite differential terminals of the output bridge, is nondegenerative with respect to differentially-amplified signal voltage and includes effectiveness at a signal frequency of zero cycles per second. Where pentodes 1, 2, 3 and 4 are of the 6SJ7 type and circuit elements 23 and 24 are non-inductive resistors of 90,000 ohms each, the ratio of residual distortion to uncompensated distortion is of the order of 10 parts in one million parts or 0.001%.

As an additional example, occurring under the same conditions specified above for the output bridge, a residual distortion-component of differential-midpoint-potential of the first amplifying bridge exists and similarly modulates the amplifier voltage at $K_2$, $P_B$, $D_7$, $D_8$ and at screen-grid terminals $sg_1$ and $sg_2$ thereby similarly actuating generation of corrective amplified and inverted voltages respectively appearing at opposite differential terminals $D_1$ and $D_2$ of the first amplifying bridge. It is noted that, in a three-bridge amplifier the first amplifying bridge also functions as the compensating bridge.

Figure 5:
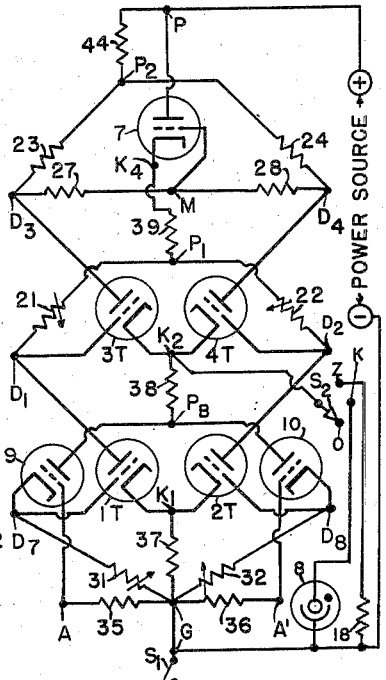
Fig. 5 is a schematic circuit diagram embodying a three bridge interlocking amplifier utilizing triodes as bridge-input tubes and further including balancing-bridge triodes.

Referring now to Fig. 5, a three-bridge embodiment of the interlocking amplifier is schematically shown employing triodes as bridge-input tubes and extending the fundamental stabilizing and balancing functions of the balancing bridge additionally to include transferrence of input signal voltage by incorporation of balancing-bridge triodes.

Circuit characters 9 and 10 respectively indicate balancing-bridge triodes respectively forming, in this third variant, the third and fourth, or load-section arms of the balancing bridge, energized by common connection of the anodes thereof to circuit point $P_B$, the cathode terminals thereof respectively constituting opposite differential terminals $D_7$ and $D_8$ of the balancing bridge, and the control-grids thereof being respectively connected to amplifier signal input terminals A and A'.

Circuit characters 1T and 2T respectively indicate bridge-input triodes respectively forming the first and second or input-section arms of the first amplifying bridge, energized by respective connection of the anodes thereof to opposite differential terminals $D_1$ and $D_2$, having the cathodes thereof joined by common connection to $K_1$, and having the control-grids thereof respectively connected to opposite differential terminals $D_7$ and $D_8$ of the balancing bridge.

Circuit characters 3T and 4T respectively indicate bridge-input triodes respectively forming the first and second or input-section arms of the second amplifying bridge, energized by respective connection of the anodes thereof to opposite differential terminals $D_3$ and $D_4$, having the cathodes thereof joined by common connection to $K_2$, and having the control-grids thereof respectively connected to opposite differential terminals $D_1$ and $D_2$ of the first amplifying bridge.

Circuit characters 38, 39 and 44 respectively indicate voltage dropping resistors, resistor 38 being connected between $P_B$ and $K_2$, resistor 39 being connected between $P_1$ and $K_4$, and resistor 44 being connected between the positive terminal of the output bridge and the amplifier positive energizing terminal. Resistors 38, 39 and 44 have been included for purposes of discussion and may be short-circuited as desired.

As a special case of the amplifier of Fig. 5, and to facilitate discussion thereof, assume: that tubes 1T and 2T are each one half of a type 6SC7 tube; that tubes 3T and 4T are each one half of a type 6SC7 tube; that tube 7 is a type 6SC7 tube with the anodes thereof connected in parallel and with the control-grids thereof similarly parallel-connected; that tube 9 is one section of a type 6SC7 tube; that tube 10 is one section of a type 6SC7 tube; that circuit elements 31, 32, 37, 38 and 39 are noninductive resistors of 1000 ohms each; that circuit element 44 is a 500 ohm noninductive resistor; that circuit elements 21, 22, 23 and 24 are noninductive resistors of 125,000 ohms each; that circuit elements 35 and 36 are noninductive resistors of 1 megohm each; that circuit elements 27 and 28 are noninductive resistors of 1 megohm each; that circuit elements 27 and 28 are noninductive resistors of 1 megohm each; and that the power source provides 758 volts, voltage-regulated.

With input signal voltage quiescent and in accordance with the principles previously described in discussion of Fig. 4, the above-described special-case amplifier of Fig. 5 provides a stabilizing structure wherein: the first and second energizing current paths have equal impedances and equal energizing currents of 0.004 ampere each; the anode voltage of each activated tube section is 250 volts; the anode current of each activated tube section is 0.002 ampere; the control-grid voltage of each activated tube section is minus 2 volts; the differential-midpoint-potentials of the balancing bridge, first amplifying bridge, and second amplifying bridge, each taken with reference to amplifier reference potential, are respectively plus 2 volts, plus 254 volts and plus 506 volts; amplifier voltages respectively taken at $K_1$, $K_2$ and $K_4$ respectively are plus 4 volts, plus 256 volts and plus 508 volts; amplifier voltages respectively taken at $P_B$, $P_1$ and $P_2$ respectively are plus 252 volts, plus 504 volts and plus 756 volts; the load section range-of-potentials of the balancing bridge, extending between plus 2 volts and plus 252 volts, is held in fixed relation to and is substantially common with the input-section range of potentials of the first amplifying bridge, extending between plus 4 volts and plus 254 volts; the input-section range-of-potentials of the second amplifying bridge, extending between plus 256 volts and plus 506 volts, is held in fixed relation to and is substantially common with the load-section range-of-potentials of the first amplifying bridge, extending between plus 252 volts and plus 502 volts; the available differential-voltage gain of the balancing bridge approximates 0.56; the available differential-voltage gain of the first amplifying bridge approximates 50; the available differential-voltage gain of the second amplifying bridge approximates 50; the available overall differential-voltage gain of the amplifier approximates 1400; and the available prudent amplified differential-voltage output is 195 volts characterized by an output-bridge residual-distortion-component of differential-midpoint-potential approximating 0.05 volt at full output.

Continuing with reference to Fig. 5, it is observed: that inclusion of balancing-bridge triodes 9 and 10 provides a third variant of the family of interlocking amplifiers; that balancing-bridge triodes 9 and 10 are individually self-biased respectively by balancing-bridge input-section resistors 31 and 32 thereby fundamentally providing respectively at opposite differential terminals $D_7$ and $D_8$ voltages responsive in stabilizing relation to first energizing current polarizing the balancing bridge, said voltages also being differentially responsive in balancing relation to manual complementary variation of the magnitudes of resistors 31 and 32, said voltages being additionally responsive in modified cathode follower relation to full-wave signal voltage impressed on and between amplifier signal input terminals A and A' or to half-wave signal voltage impressed on and between G and either A or A'; that potentials appearing respectively at $D_7$ and $D_8$ are respectively common with potentials at the control-grids of the pair of first-amplifying-bridge bridge-input tubes, thereat, taken with reference to potential at $K_1$, respectively constituting control-grid voltages actuating stabilizing control of second energizing current and amplified and inverted cross-stabilizing control of first energizing current and hence of amplified voltage at $P_B$, said first-amplifying-bridge control-grid voltages also actuating balance of the first amplifying bridge, said first-amplifying bridge control-grid voltages additionally actuating differential amplification of the differential voltage appearing between opposite differential terminals $D_7$ and $D_8$; that, whereas "cathode follower" action is customarily predicated on an unvarying anode voltage, the modified cathode follower relationship of the balancing bridge as combined with interlocking stabilization, responsive to half-wave or unbalanced signal excitation, effects modulation of the differential-midpoint-potential of the balancing bridge resulting in an amplified inversion thereof appearing at $P_B$ and functioning to effect conversion of half-wave or unbalanced input signal excitation to full-wave differential-voltage.

The amplifier of Fig. 5 has been treated as a special case to facilitate description thereof. It will be understood that, with power supply voltage permitted to vary within reasonable limits, proportionate division of amplifier energizing voltage continues to be effective and that amplifier balance is independent of reasonable variation of amplifier energizing voltage. It will also be understood: that resistors 38, 39 and 44 may be short-circuited, as desired, with no adverse effect on amplifier operation; that gain-control resistor 29 may be connected between opposite differential terminals $D_1$ and $D_2$ as in Fig. 4; and that power amplification is available, as desired, by connection of circuit elements $S_2$, 8 and 18 between $K_2$ and G as previously described.

It is of interest to note that the overall voltage gain of 1400, available in the amplifier of Fig. 5 as described, compares unfavorably with an overall voltage gain of 18,000 reasonably available in the amplifier of Fig. 4 or with an overall voltage gain of 10,000 reasonably available in the amplifier of Fig. 7. It is, however, important to note that both the electrical and realizable physical structures of the amplifier of Fig. 5 are symmetrical, thereby providing cancellation of the adverse effects of stray electrical or magnetic fields, thus providing stable high-gain amplification based on the employment of electronic or crystal triodes.

Referring now to Fig. 6, a four-bridge embodiment of the interlocking amplifier is schematically shown, extending the schematics of Fig. 5 to include a third amplifying bridge and additionally including differential-follower triodes in the third and fourth or load-section arms of the output bridge.

Circuit characters 5T and 6T respectively indicate bridge-input triodes respectively forming the first and second or input section arms of the third amplifying bridge, energized by respective connection of the anodes thereof to opposite differential terminals $D_5$ and $D_6$ of the third amplifying bridge, having the cathodes thereof joined by common connection to $K_3$, the negative energizing terminal of the third amplifying bridge, and having the control-grids thereof respectively connected to opposite differential terminals $D_3$ and $D_4$ of the second amplifying bridge.

Circuit characters 15 and 16 respectively indicate two equal biasing resistors, resistor 15 being connected between $D_5$ and the anode of 5T, resistor 16 being connected between $D_6$ and the anode of 6T. Biasing resistors 15 and 16 are required incidental to employment of differential-follower triodes in an output bridge and may be short-circuited when differential-follower triodes are replaced by third and fourth arm resistors or resistive impedances.

Circuit characters 11 and 12 respectively indicate differential-follower triodes respectively forming the third and fourth or load-section arms of an output bridge, respectively energized by common connection of the anodes thereof to the positive energizing terminal ($P_3$ of Fig. 6) of the output bridge, the cathodes thereof respectively forming opposite differential terminals of the output bridge (here $D_5$ and $D_6$ of Fig. 6), and the control-grids thereof being respectively connected to the anodes of the output-bridge bridge-input tubes.

Differential followers 11 and 12, as respectively and negatively biased by the anode currents of bridge-input tubes 5T and 6T respectively flowing through biasing resistors 15 and 16, when taken in stabilizing, current-regulating or virtually-paralleled relation, provide an output-bridge load-section impedance varying in proportion to the magnitude of said negative bias and opposing change of the output-bridge aggregate energizing current thereby improving voltage regulation of the differential-midpoint-potential of the output bridge by decreasing the magnitude of the increment of output-bridge aggregate energizing current necessary to effect said voltage regulation, changes in amplifier energizing voltage thus tending to be absorbed in the load-section of the output bridge. Differential follower triodes have been included in the amplifier of Fig. 6 to provide constant voltage gain in the absence of a voltage-regulated power source. Where the power source is voltage-regulated, third and fourth arm resistors 25 and 26 (of Fig. 10) may respectively be substituted for triodes 11 and 12.

The theory of differential follower triodes employed in a full-wave bridge has been established in the prior art by my Patent No. 2,543,819 of March 6, 1951, entitled "Push-Pull-Differential Electronic Amplifier." Accordingly, its detailed discussion here is omitted.

Continuing with reference to Fig. 6, voltage dropping resistor 39 is here connected between $P_1$ and $K_3$, and voltage dropping resistor 44 is here connected between $P_3$ and P. Circuit character 40 indicates a voltage dropping resistor connected between $P_2$ and $K_4$. It is noted that in the four-bridge amplifier of Fig. 6, series-connected output-differential-load-impedances 27 and 28 are connected between opposite differential terminals $D_5$ and $D_6$ of the output bridge. Circuit characters 17, 19, and 20 respectively indicate resistive potentiometers with the moveable arms thereof respectively connected to circuit points G, $P_1$ and $P_2$, the resistive element of potentiometer 17 being centrally included in series-connection with balancing-bridge input-section-arm elements 31 and 32, the resistive element of potentiometer 19 being centrally included in series-connection with first-amplifying-bridge load-section arms 21 and 22, the resistive element of potentiometer 20 being centrally included in series-connection with second-amplifying-bridge load-section arms 23 and 24, the two resistive sections of potentiometer 17, being respectively included in the first and second arms of the balancing bridge, providing manually-adjustable means varying the respective resistances of the input-section arms of the balancing bridge, in complementary relation, thereby controlling balance of the balancing bridge and of the anode currents of the first amplifying bridge, the two resistive sections of potentiometer 19, being respectively included in the third and fourth arms of the first amplifying bridge, providing manually adjustable means varying, in complementary relation, the respective resistances of the load-section arms of the first amplifying bridge thereby controlling, as desired, equalization of voltage-drops across said first-amplifying-bridge load-section arms, and the two resistive sections of potentiometer 20, being respectively included in the third and fourth arms of the second amplifying bridge or compensating bridge, providing manually-adjustable means varying, in complementary relation, the respective resistances of the load-section arms of the compensating bridge thereby providing control of system balance or "position control" of the "trace" of a related cathode ray tube.

Extending the special case of the Fig. 5 amplifier to facilitate discussion of Fig. 6, additionally assume by way of example: that tubes 5T and 6T are each one half of a type 6SC7 tube; that tubes 11 and 12 are respectively one half of discrete 6SC7 tubes or equivalent triodes, the other included tube sections being inactive; that circuit elements 15 and 16 are noninductive resistors of 1000 ohms each; that circuit element 40 is a 1500 ohm noninductive resistor; that circuit elements 27 and 28, in the amplifier of Fig. 6, are noninductive resistors of 125,000 ohms each; and that the power source provides 1012 volts, voltage-regulated.

Figure 6A:
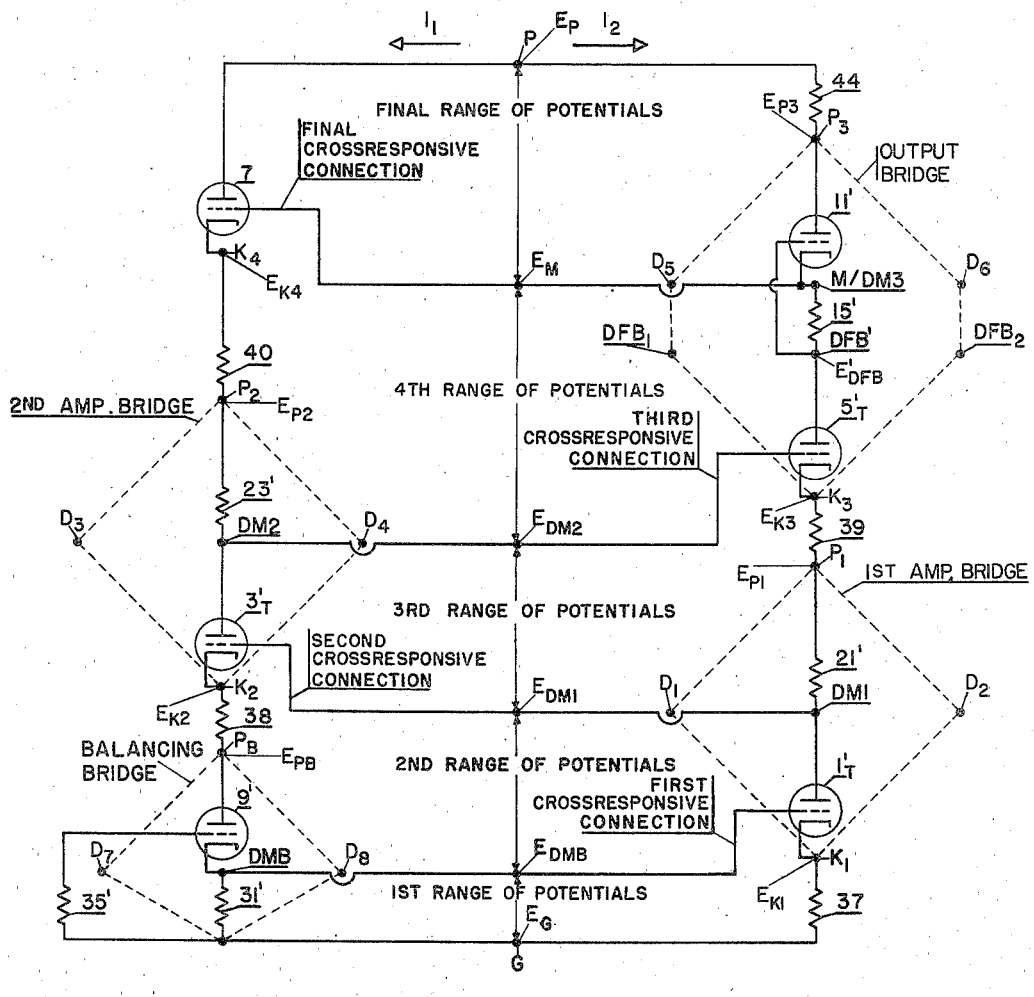
Fig. 6a is an equivalent circuit diagram of the stabilizing sequence of successively-adjacent bridges of Fig. 6 showing cross-responsive virtual connection of the energizing current paths thereof superimposed on a block diagram showing the interrelation of shared ranges-of-potentials characteristic of the interlocking amplifier.

With input signal quiescent and in accordance with the principles previously described in discussion of Figs. 4 and 5, the above-described special-case amplifier of Fig. 6 provides a stabilizing structure, equivalently shown in Fig. 6a, wherein: the first and second energizing current paths have equal impedances and equal energizing currents of 0.004 ampere each; the anode voltage of each activated tube section is 250 volts; the anode current of each activated tube section is 0.002 ampere; the control-grid bias voltage of each activated tube section is minus 2 volts; the differential midpoint-potentials of the balancing bridge, first amplifying bridge, second amplifying bridge, and output bridge, each taken with reference to amplifier reference potential, respectively are plus 2 volts, plus 254 volts, plus 506 volts, and plus 760 volts; amplifier voltages taken at $K_1$, $K_2$, $K_3$ and $K_4$ respectively are plus 4 volts, plus 256 volts, plus 508 volts and plus 762 volts; amplifier voltages taken at $P_B$, $P_1$, $P_2$, $P_3$ and P respectively are plus 252 volts, plus 504 volts, plus 756 volts, plus 1010 volts and 1012 volts; the load-section range-of-potentials of the balancing bridge, extending between plus 2 volts and plus 252 volts, is held in fixed relation to and is substantially common with the input-section range-of-potentials of the first amplifying bridge, extending between plus 4 volts and plus 254 volts; the input-section range-of-potentials of the second amplifying bridge, extending from plus 256 volts to plus 506 volts, is held in fixed relation to and is substantially common with the load-section range-of-potentials of the first amplifying bridge, extending between plus 254 volts and plus 504 volts; the input-section range-of-potentials of the third amplifying bridge (here the output bridge), extending between plus 508 volts and plus 760 volts, is held in fixed relation to and is substantially common with the load-section range-of-potentials of the second amplifying bridge or compensating bridge, extending between plus 506 volts and plus 756 volts; the range-of-potentials across the compensating conductance, extending between plus 762 volts and plus 1012 volts, is held in fixed relation to and is substantially common with the load-section range-of-potentials of the output bridge, extending between plus 760 volts and plus 1010 volts; the available differential-voltage gain of the output bridge approximates 70; the available overall differential-voltage gain of the amplifier approximates 98000; and the available prudent amplified differential voltage output is 195 volts, characterized by an output-bridge residual-distortion-component of differential-midpoint-potential of negligible magnitude.

Continuing with combined reference to Figs. 6 and 6a, it is observed:

(1) That inclusion of differential-follower triodes and balancing bridge triodes constitutes a fourth variant of the basic interlocking amplifiers;

(2) That, without disturbing amplifier operation, a group of virtual resistances, each of infinite magnitude, respectively having electrical virtual midpoints DMB, DM1, DM2, DM3, may be considered as connected between opposite differential terminals respectively of the balancing bridge, the first amplifying bridge, the second amplifying bridge and the third amplifying bridge, DMB having balancing-bridge differential-midpoint-potential $E_{DMB}$ particular thereto, DM1 having first-amplifying-bridge differential-midpoint-potential $E_{DM1}$ particular thereto, DM2 having second-amplifying-bridge differential-midpoint-potential $E_{DM2}$ particular thereto, and DM3 having third-amplifying-bridge differential-midpoint-potential $E_{DM3}$ particular thereto;

(3) That, in the amplifier of Fig. 6, $E_{DM3}$ is identical with $E_M$, the midpoint potential of the output differential load impedance.

Referring now to Fig. 6a, an equivalent circuit diagram of the four-bridge interlocking amplifier of Fig. 6, taken in stabilizing relation or virtually-paralleled-connection of complementary differential elements, is shown schematically superimposed on a diagram indicating the differential bridge-arms virtually parallel-connected, and indicating the interrelation of shared range-of-potentials characteristic of the interlocking amplifier.

Circuit character $35'$ indicates an amplifier virtual signal input impedance, equivalent in stabilizing relation to the virtually parallel-connected impedances of circuit elements 35 and 36 and having a direct-current resistive path with resistance equal to the product of the resistances of circuit elements 35 and 36 divided by the sum thereof.

Circuit character $31'$ indicates the balancing-bridge input-section impedance, equivalent in stabilizing relation to the virtually parallel-connected impedances of circuit elements 31 and 32 and having a direct-current resistive path with resistance equal to the product of the resistances of circuit elements 31 and 32 divided by the sum thereof.

Circuit character $21'$ indicates the load-section impedance of the first amplifying bridge, equivalent in stabilizing relation to the virtually parallel-connected impedances of circuit elements 21 and 22 and having a direct-current resistive path with resistance equal to the product of the resistances of circuit elements 21 and 22 divided by the sum thereof.

Circuit character $23'$ indicates the load-section impedance of the second amplifying bridge, equivalent in stabilizing relation to the virtually parallel-connected impedances of circuit elements 23 and 24 and having a direct-current resistive path with resistance equal to the product of the resistances of circuit elements 23 and 24 divided by the sum thereof.

Circuit character $15'$ indicates a virtual output-bridge biasing resistor, equivalent in stabilizing relation to the virtually parallel-connected resistances of circuit elements 15 and 16 and having resistance equal to the product of the resistance of circuit elements 15 and 16 divided by the sum thereof.

Circuit character $9'$ indicates a virtual balancing-bridge load-section triode, equivalent in stabilizing relation to virtually parallel-connected balancing-bridge triodes 9 and 10, having balancing-bridge load-section conductance or impedance particular thereto, balancing-bridge load-section conductance being variable and equal at any instant of time to the sum of the conductances of circuit elements 9 and 10, balancing-bridge load-section impedance providing a variable direct-current resistive path with resistance, taken at any instant of time, equal to the product of the resistances of the anode-to-cathode resistance paths of circuit elements 9 and 10 divided by the sum thereof.

Circuit character $1_T'$ indicates a virtual triode, equivalent in stabilizing relation to virtually parallel-connected first-amplifying-bridge bridge-input triodes 1T and 2T, having first-amplifying-bridge input-section conductance or impedance particular thereto, first-amplifying-bridge input-section conductance being variable and equal, at any instant of time, to the sum of the conductances of circuit elements 1T and 2T, first-amplifying-bridge input-section impedance being coexistent with first-amplifying-bridge input-section conductance and providing a direct-current resistive path with variable resistance, taken at any instant of time, equal to the product of the resistances of the anode-to-cathode resistance paths of circuit elements 1T and 2T divided by the sum thereof.

Circuit character $3_T'$ indicates a virtual triode, equivalent in stabilizing relation to virtually parallel-connected second-amplifying-bridge bridge-input triodes 3T and 4T, having second-amplifying-bridge input-section conductance or impedance particular thereto, second-amplifying-bridge input-section conductance being variable and equal, at any instant of time, to the sum of the conductances of circuit elements 3T and 4T, second-amplifying-bridge input-section impedance being coexistent with second-amplifying-bridge input-section conductance and providing a direct-current resistive path with variable resistance, taken at any instant of time, equal to the product of the resistances of the anode-to-cathode resistance paths of circuit elements 3T and 4T divided by the sum thereof.

Circuit character $5_T'$ indicates a virtual triode, equivalent in stabilizing relation to virtually parallel-connected third-amplifying-bridge bridge-input triodes 5T and 6T, having variable conductance equal, at any instant of time, to the sum of the conductances of circuit elements 5T and 6T and having variable impedance equal to the reciprocal of its coexistent conductance, the sum of the impedances of $5_T'$ and $15'$, taken in virtual series-connection, constituting the input-section impedance of the third amplifying bridge functioning as an output bridge, the reciprocal of said output-bridge input-section impedance being the output-bridge input-section conductance.

Circuit character $11'$ indicates a virtual triode, equivalent in stabilizing relation to virtually parallel-connected output-bridge differential-follower triodes 11 and 12, having output-bridge load-section variable conductance particular thereto equal, at any instant of time, to the sum of the conductances of circuit elements 11 and 12.

Continuing with reference to the energizing and stabilizing equivalent electrical structure of Fig. 6a, with the power source voltage-regulated and with input signal-voltage quiescent, it is observed:

(1) That first and second energizing current paths are provided, energized in parallel-connection from a common power source;

(2) That each of the energizing current paths is comprised of a plurality of variable conductances and a plurality of fixed conductances, the combined plurality of conductances forming each current path being energized in series-connection;

(3) That each of said variable conductances is particular to a triode or to an equivalent or virtual triode and has, interposed between the cathode thereof and G, a biasing impedance or conductance herein termed an inferior impedance or conductance, and also has, except in the case of compensating conductance 7, interposed between the anode thereof and P, a voltage-dropping impedance or conductance herein termed a superior impedance or conductance;

(4) That the anode current $I_1$ of self-biased virtual triode $9'$ flowing through self-biasing equivalent impedance $31'$ generates thereacross a self-biasing control-grid voltage, appearing at virtual circuit point DMB as differential-midpoint-potential $E_{DMB}$, being responsive to anode supply voltage $E_{PB}$ appearing at $P_B$ and establishing self-actuated stabilizing adjustment of the magnitude of anode current mutually satisfying required interrelation of the magnitudes of anode current, anode voltage and control-grid voltage as graphically summarized by the average plate characteristics of virtual triode 9';

(5) That, the control-grid of virtual triode $1_T'$ being cross-responsively connected at circuit point DMB to differential-midpoint-potential $E_{DMB}$, responsive to anode supply voltage $E_{P1}$ at $P_1$ and to control-grid potential $E_{DMB}$, the anode current $I_2$ flowing through related inferior and superior impedances generates respectively thereacross a biasing voltage $E_{K1}$, appearing at $K_1$, and a voltage-drop across load-section impedance 21', appearing at DM1 as first-amplifying-bridge differential-midpoint-potential $E_{DM1}$, biasing voltage $E_{K1}$ combining with control-grid potential $E_{DMB}$ to provide control-grid voltage establishing self-actuated stabilizing adjustment of the magnitude of anode current $I_2$;

(6) That, the control-grid of virtual triode $3_T'$ being cross-responsively connected at DM1 to differential-midpoint-potential $E_{DM1}$, responsive to anode supply voltage $E_{P2}$ at $P_2$ and to control-grid potential $E_{DM1}$, the anode current $I_1$ of virtual triode $3_T'$ flowing through related inferior and superior impedances generates respectively thereacross a biasing voltage $E_{K2}$ appearing at $K_2$, and a voltage-drop across load-section impedance 23', appearing at DM2 as second-amplifying-bridge differential-midpoint-potential $E_{DM2}$, biasing voltage $E_{K2}$ combining with control-grid potential $E_{DM1}$ to provide control-grid voltage establishing self-actuated stabilizing adjustment of the magnitude of anode current $I_1$ mutually satisfying required interrelation of the magnitudes of anode current, anode voltage and control-grid voltage as graphically summarized by the average plate characteristics of virtual triode $3_T'$;

(7) That, first energizing current $I_1$, being common to virtual triodes 9' and $3_T'$ the control-grid voltages of virtual triodes 9' and $3_T'$ respectively and mutually function to establish self-actuated stabilizing adjustment of the magnitude of first energizing current $I_1$ and of the voltages thereby generated in mutual operative satisfaction of the average plate characteristics of virtual triodes 9' and $3_T'$;

(8) That, the control-grid of virtual triode $5_T'$ being cross-responsively connected at DM2 to differential-midpoint-potential $E_{DM2}$, responsive to anode supply voltage $E_{P3}$ at $P_3$ and to control-grid potential $E_{DM2}$, the anode current $I_2$ of virtual triode $5_T'$ flowing through related inferior and superior impedances generates respectively thereacross a biasing voltage $E_{K3}$, appearing at $K_3$, and voltage-drops across series-connected biasing virtual resistor 15', output-bridge load-section impedance 11' and resistor 44, appearing at $P_3$ as third-amplifying-bridge positive-terminal potential or voltage $E_{P3}$, appearing at DM3 (or M) as output-bridge differential-midpoint-potential $E_{DM3}$ (or $E_N$), and appearing at DFB as biasing voltage $E_{DFB}'$, biasing voltage $E_{K3}$ combining with control-grid potential $E_{DM2}$ to provide control-grid voltage establishing self-actuated stabilizing adjustment of the magnitude of anode current $I_2$ mutually satisfying required interrelation of the magnitudes of anode current, anode voltage and control-grid voltage as graphically summarized by the average plate characteristics of virtual triode $5_T'$;

(9) That, second energizing current $I_2$ being common to virtual triodes $1_T'$ and $5_T'$, the control-grid voltages of virtual triodes $1_T'$ and $5_T'$ respectively and mutually function to establish self-actuated stabilizing adjustment of the magnitude of second energizing current and of the voltages thereby generated in mutual operative satisfaction of the average plate characteristics of virtual triodes $1_T'$ and $5_T'$;

(10) That, accordingly, successive cross-responsive connection of the control-grids of virtual triodes $1_T'$, $3_T'$ and $5_T'$, respectively at DMB, DM1 and DM2, respectively differential-midpoint-potentials $E_{DMB}$, $E_{DM1}$ and $E_{DM2}$, constitutes progressive cross-responsive and inter-responsive stabilizing cross-connection of first and second energizing currents, thereby establishing, in inverse cascade, consecutive stabilized ranges-of-potentials respectively and successively taken between $E_G$ and $E_{DMB}$, between $E_{DMB}$ and $E_{DM1}$, and between $E_{DM1}$ and $E_{DM2}$;

(11) That, the control-grid of compensating triode 7 being cross-responsively connected at M to third-amplifying-bridge differential-midpoint-potential $E_{DM3}$, responsive to amplifier energizing voltage $E_P$ at P and to control-grid potential $E_{DM3}$, the anode current $I_1$ of compensating conductance 7, flowing through its related inferior impedance, generates thereacross biasing voltage $E_{K4}$, appear at $K_4$, biasing voltage $E_{K4}$ combining with control-grid potential $E_{DM3}$ to provide control-grid voltage establishing self-actuated stabilizing adjustment of the magnitude of first energizing current $I_1$ mutually satisfying required interrelation of the magnitudes of anode current, anode voltage and control-grid voltage as graphically summarized by the average plate characteristics of triode 7;

(12) That, first energizing current $I_1$ being common to triode 7 and to virtual triodes 9' and $3_T'$, the control-grid voltages of said tubes respectively and mutually function to establish self-actuated stabilizing adjustment of the magnitude of first energizing current and of the voltages thereby generated in mutual operative satisfaction of the respective average plate characteristics of said tubes, thus extending the establishment, in inverse cascade, of successive stabilized ranges-of-potentials to include the range-of-potentials between $E_{DM2}$ and $E_{DM3}$, and, with the power source voltage-regulated, further including the range-of-potentials between $E_{DM3}$ and $E_P$;

(13) That the establishment of consecutive stabilized ranges-of-potentials, as above described, constitutes stabilizing proportionate division of amplifier energizing voltage;

(14) That the variable conductance of virtual differential-follower triode 11', with second energizing current $I_2$ flowing therethrough, constitutes the output-bridge load-section conductance and, being responsive to self-biasing control-grid voltage generated by $I_2$ flowing through virtual biasing resistor 15', provides stabilizing means self-actuated by, and opposing change of, second energizing current, thereby, in major degree when amplifier energizing voltage is later permitted to vary, absorbing, in the output-bridge load-section, changes in amplifier energizing voltage, thus voltage-regulating the differential-midpoint-potential, $E_M$, of the output bridge and providing, in the amplifying structure of Fig. 6, an amplifier of substantially constant gain;

(15) That voltage regulation of output-bridge differential-midpoint-potential $E_M$, as above described and as cross-responsively combined with $E_{K4}$, provides, when amplifier energizing voltage is later permitted to vary, cross-responsive control-grid-voltage means actuating absorption of changes in amplifier energizing voltage within the variable conductance of compensating conductance 7, thereby providing voltage regulation of $E_{K4}$;

(16) That, as modified by respective essential grid bias voltages of related tubes, and with the first or low-potential range-of-potentials functioning as a stabilized reference voltage, each subsequent stabilized range-of-potentials, consecutively taken in inverse cascade, is common with an interlocked with the load-section voltage-drop of an instant bridge and the input-section voltage-drop of its related superior bridge, the variable conductance of compensating conductance 7 functioning, in stabilizing relation, as the input-section of a superior bridge related to the output bridge as an instant bridge;

(17) That, with respect to an instant amplifying bridge when input signal voltage becomes effective, the variable input-section conductance of the related superior bridge, being actuated at any instant by modulation of the stabilized differential-midpoint-potential of said instant bridge and more particularly by modulation of the differential-midpoint-potential of said instant bridge resulting from the distortion-component of differential-midpoint-potential thereof, functions in stabilizing relation and as enabling means to alter in like polarity sense amplifier voltages simultaneously taken at the positive terminal of the related inferior bridge, at both opposite differential terminals of said inferior bridge and at both control-grids of the pair of bridge input tubes of said instant bridge, the compensating conductance functioning in this respect as the input-section conductance of a superior bridge related to the output bridge as an instant bridge;

(18) That the above described transferrence of the distortion-component of differential-midpoint-potential of an instant bridge, in substantially identical phase and magnitude, to the control-grids of the bridge-input tubes of said instant bridge constitutes differentially-nondegenerative virtual feedback means actuating correction of distortion as it tends to occur and reducing said distortion-component to a residual-distortion-component of negligible magnitude;

(19) That when half-wave signal-input voltage is activated, responsive to the amplified inversion of the modulation thereby superimposed on $E_{DMB}$ appearing at DM1 as modulation of $E_{DM1}$ and activated thereby the variable input-section conductance of the second amplifying bridge functions to modulate or alter balancing-bridge positive-terminal voltage $E_{PB}$ at $P_B$ thereby effecting conversion of half-wave signal-input voltage to a full-wave differential voltage appearing at and between opposite differential terminals $D_7$ and $D_8$ of the balancing bridge.

Continuing further with combined reference to Figs. 6 and 6a, it is additionally observed:

(20) That resistors 38, 39, 40 and 44 have been included to facilitate description of proportionate division of amplifier energizing voltage as based on the graphic arrangement of Fig. 6a;

(21) That, accordingly and without disturbing amplifier operation or the proportionate division of amplifier energizing voltage, resistors 39 and 40 may be short-circuited provided the respective resistances of circuit elements 21, 22, 21', 23, 24 and 24' are appropriately increased in magnitude;

(22) That resistors 38 and 44 may be short-circuited as desired without adversely affecting the stability or performance of the amplifier, short-circuiting of this character resulting only in minor redistribution of amplifier energizing voltage;

(23) That, when, as may often happen based on desired economy of component tubes and as presented in the amplifiers of Figs. 4, 5, 7, 10 and 12, output-bridge load-section arms of fixed impedance are employed in lieu of differential-follower triodes 11 and 12, and biasing resistors 15 and 16 are accordingly short-circuited, the ability of the output-bridge load-section to absorb changes in amplifier energizing voltage is impaired and voltage-regulation of the power source is accordingly desireable; and,

(24) That, in generalized extension of the stabilizing relationships established by Fig. 6a, it is importantly observed that when bridge-input pentodes are utilized replacing the bridge-input triodes of Figs. 6 and 6a, resulting from the substantial independence of pentode anode current from changes in anode voltage as previously described in discussion of Figs. 1, 2, 3, and 4, greater voltage gain per amplifying bridge and more favorable utilization of virtual feedback means are desirably available.

Referring now to Fig. 7, a three-bridge embodiment of the interlocking amplifier is schematically shown, extending the schematics of Fig. 4 to include balancing-bridge triodes.

Continuing with reference to Fig. 7, it is observed:

(1) That inclusion of balancing-bridge triodes forms the third named variant of the family of interlocking amplifiers;

(2) That, by including balancing-bridge triodes, the magnitudes of circuit elements 31 and 32 may be made small thereby permitting physical, but not electrical, separation of the balancing bridge and amplifying bridges, the balancing bridge being relocated as desired in a remote physical position;

(3) That all circuit elements have previously been identified and their relationships and functions have been fully discussed.

Referring now to Fig. 8, a three-bridge embodiment of the interlocking amplifier is schematically shown, extending the schematics of Fig. 4 to include differential-follower triodes in the output bridge.

Continuing with reference to Fig. 8, it is observed:

(1) That inclusion of differential-follower triodes forms the second named variant of the family of interlocking amplifiers;

(2) That by modifying the schematics of Fig. 4 to include differential-follower triodes improved voltage regulation is made available at circuit point M where the amplifier is utilized as a voltage amplifier and circuit elements 8 and 18 are inactive;

(3) That all circuit elements have previously been identified and their relationships and functions have been fully discussed.

Referring now to Fig. 9, a three-bridge embodiment of the interlocking amplifier is schematically shown extending the schematics of Fig. 4 to include both balancing-bridge triodes and differential-follower triodes.

Circuit character $S_3$ indicates a two position switch with the moveable arm thereof connected to the high potential end of voltage-dropping resistor 42, the first selector terminal thereof being normally activated as shown and providing energizing connection of resistor 42 to $P_1$, the second selector terminal thereof providing alternative energizing connection of resistor 42 to M thereby providing means "preloading" the differential-follower triodes as sometimes desired. It is noted that the above described means is introduced to improve the normal operative linearity of differential-follower triodes 11 and 12 by drawing fixed values of cathode current therefrom independently from biasing current flowing through biasing resistors 15 and 16, and it is also noted that this means of preloading the differential-follower triodes involves an undesirable energizing voltage-drop across circuit elements 27 and 28.

Continuing with reference to Fig. 9, it is observed:

(1) That inclusion of balancing-bridge triodes and differential-follower triodes forms the fourth named variant in the family of interlocking amplifiers;

(2) That all remaining circuit elements have previously been identified and their functions and relationships have been fully described;

(3) That by operative connection of terminals U' and U'' of Fig. 14 respectively to opposite differential terminals $D_3$ and $D_4$, as by closure of switch $S_4$ as hereinafter described, differential-follower triodes may be preloaded as desired without involving energizing voltage-drops across circuit elements 27 and 28.

Referring now to Fig. 10, a four-bridge embodiment of the interlocking amplifier is schematically shown extending the schematics of Fig. 4 to include a third amplifying bridge.

Circuit characters 25 and 26 respectively indicate nominally equal resistors or resistive impedances respectively forming the third and fourth or load-section arms of the third amplifying bridge, each being energized by common connection of one end thereof to positive energizing terminal $P_3$ of the third amplifying bridge, the opposite ends of circuit elements 25 and 26 respectively constituting opposite differential terminals $D_5$ and $D_6$ of the third amplifying bridge.

Circuit characters 5 and 6 respectively indicate bridge-input pentodes respectively forming the first and second or input-section arms of the third amplifying bridge, with the cathodes and suppressor-grids thereof electrically joined by common connection to negative energizing terminal $K_3$ of the third amplifying bridge, with the anodes thereof energized by respective connection to opposite differential terminals $D_5$ and $D_6$, with the screen-grids thereof electrically joined and energized by connection through voltage-dropping resistor 43 to $K_4$ or $P_2$, and with the control-grids thereof respectively connected to opposite differential terminals $D_3$ and $D_4$.

Continuing with reference to Fig. 10, it is observed:

(1) That the amplifier of Fig. 10 constitutes the first named variant of the family of interlocking amplifiers;

(2) That remaining circuit elements have previously been identified and their functions and relationships have fully been described;

(3) That the third amplifying bridge here being an output bridge, the output differential load impedance is here connected between opposite differential terminals $D_5$ and $D_6$;

(4) That, in addition to providing greater amplifier voltage gain, addition of the third amplifying bridge provides control of voltage gain and of a related cathode ray tube trace position without disturbing amplifier balance;

(5) That the amplifier of Fig. 10, with component tubes and circuit constants chosen to provide a measured voltage gain of 350,000, and as observed by cathode ray tube methods, is stable over long periods of time and is characterized by very low values of drift, jitter, and distortion.

Referring now to Fig. 11, a four-bridge embodiment of the interlocking amplifier is schematically shown, extending the schematics of Fig. 10 to include differential follower triodes in the load-section arms of the output bridge.

Continuing with reference to Fig. 11, it is observed:

(1) That the amplifier of Fig. 11 constitutes a second variant of the family of interlocking amplifiers;

(2) That all circuit elements have previously been identified and their functions and relationships have previously been described;

(3) That the amplifier of Fig. 11, with component tubes and circuit constants chosen to provide a stable voltage gain of 139,000, is characterized by very low values of drift and jitter and is suitable for employment in measurement of strain.

Referring now to Fig. 12, a third variant of the family of interlocking amplifiers is schematically shown, extending the schematics of Fig. 10 to include a stabilizing bridge.

Circuit character 48 indicates a voltage-dropping resistor connected between $K_4$ and positive energizing terminal $P_S$ of the stabilizing bridge.

Circuit elements 13 and 14 respectively indicate triodes respectively forming the third and fourth or load-section arms of the stabilizing bridge, with the anodes thereof energized by common connection to $P_S$, with the cathodes thereof respectively constituting opposite differential terminals $D_9$ and $D_{10}$ of the stabilizing bridge, respectively having control-grid terminals A″ and A‴ respectively connected through input resistors 45 and 46 to G, terminals A″ and A‴ respectively forming auxiliary signal input terminals.

Circuit character 47 indicates a resistive potentiometer with the moveable arm thereof connected to G and with the opposite ends of the resistive element thereof respectively connected to the respective low-potential ends of circuit elements 35 and 36, thereby providing manually-controlled means effecting complementary adjustment of the relative magnitudes of 35 and 36. Opposite differential terminals $D_9$ and $D_{10}$ being respectively connected to circuit terminals A and A′, circuit elements 35 and 36 here respectively form the first and second or input-section arms of the stabilizing bridge.

Continuing with reference to Fig. 12, it is observed:

(1) That the stabilizing bridge, when combined with a very high gain interlocking amplifier having an odd number of amplifying bridges, responsive to the residual-distortion-component of output-bridge differential-mid-point-potential at M functions to provide at M and at any instant of time, a superimposed amplified and inverted stabilizing voltage component actuating further corrective opposition to phase shift between input signal voltage and amplifier output differential-voltage;

(2) That the stabilizing bridge, in combination with resistor 48, functions in full-wave modified cathode follower relationship to effect conversion of half-wave signal voltages, impressed between G and either A″ or A‴, to full-wave differential-voltage appearing between opposite differential terminals $D_9$ and $D_{10}$; and, (3) That, if desired, the stabilizing bridge may be incorporated in a remote signal pick up unit.

Referring now to Fig. 13, a four-bridge embodiment of the interlocking amplifier is schematically shown, as a fourth variant of the family of interlocking amplifiers, extending the schematics of Fig. 12 to include differential-follower triodes in the output bridge, and, in Fig. 13a, alternatively providing constant-current pentode voltage-dropping means respectively preloading the differential-follower triodes and transferring amplifier output differential-voltage $e_{OUT}$ from the potential level of $E_M$ to the potential level of $E_G$ as $e_{OUT}'$. A second power source is indicated with the positive terminal thereof connected to G and having a negative energizing terminal N.

Circuit character $S_4$ indicates a two-pole single-throw switch providing operational connection as desired of terminals U′ and U″ respectively to opposite differential terminals of the output bridge (here $D_5$ and $D_6$ of Fig. 13).

Circuit characters 54 and 53 respectively indicate gaseous-discharge voltage-regulator tubes series-connected at circuit point V and functioning as ballast regulators, the anode of tube 54 being connected to G and the cathode of tube 53 being series-connected at circuit point N′ through voltage-dropping resistor 59 to N, thereby providing two series-connected regulated voltages respectively taken between G and V and between V and N′.

Circuit characters 51 and 52 respectively indicate pentodes arranged for operation under conditions providing constant magnitudes of their respective anode currents, the screen-grids thereof being electrically joined and energized by connection to V, the control-grids thereof being electrically joined and connected to N′, the suppressor-grid and cathode of pentode 51 being electrically joined and connected to one end of the resistive element of balancing potentiometer 58, the suppressor-grid and cathode of pentode 52 being electrically joined and connected to the opposite end of the resistive element of potentiometer 58, the moveable arm of potentiometer 58 being connected through variable self-biasing resistor 57 to N′, and pentodes 51 and 52 respectively having anode terminals D′ and D″ respectively connected through voltage-dropping resistors 55 and 56 to moveable arm terminals U′ and U″ of switch $S_4$.

Continuing with combined reference to Figs. 13 and 13a, and with switch $S_4$ closed, it is observed:

(1) That differential-follower triodes 11 and 12 are respectively preloaded by the respective anode currents of pentodes 51 and 52, each of said pentode anode currents being substantially constant in magnitude, independent of anode voltage, and excluded from passage through biasing resistors 15 and 16 thereby shifting the operational load lines of said differential-follower triodes to areas more favorable to triode linearity;

(2) That the voltage-drops respectively taken across circuit elements 55 and 56, being substantially constant in magnitude, constitute pentode voltage-dropping means transferring amplifier output differential-voltage $e_{OUT}$ from the potential level of $E_M$ to the potential level of $E_G$ thereat appearing between terminals D' and D'' as $e_{OUT}'$;

(3) That potentiometer 58 provides manually-controlled means effecting complementary adjustment of the magnitudes of the anode currents respectively flowing through circuit elements 55 and 56, thereby providing, as desired, "position control" of the trace of a related cathode ray tube without disturbing the differential-midpoint-potential of the amplifier output bridge;

(4) That variable self-biasing resistor 57 provides means adjusting the potential level of $e_{OUT}'$ as desired; and, (5) That, where a plurality of amplifiers are utilized to control the trace of a related cathode ray tube, the employment of voltage dropping means of the character schematically indicated by Fig. 13a makes possible the establishment of a midpoint potential common to the pairs of deflecting electrodes of said cathode ray tube thereby substantially contributing to desired reduction of beam distortion.

Referring now to Fig. 14, full-wave constant-current voltage-dropping pentode means is schematically shown extending the schematics of Fig. 13a to provide optional energization above or below G potential.

Circuit character 60 indicates a transformer energized by an indicated power source and connected to energize the heater elements of pentodes 51 and 52.

Circuit character $S_5$ indicates a three-pole double-throw switch arranged to provide:

(1) In the "up" position, connection of N' to G and energizing connection of V through voltage dropping resistor 59 to P; or alternatively, (2) In the "down" position, energizing connections duplicating those previously described for Fig. 13a.

Circuit characters DJ3 and DJ4 respectively indicate a pair of deflecting electrodes of a related cathode ray tube, respectively connected to terminals D' and D''.

Continuing with reference to Fig. 14, it is observed:

(1) That switch $S_4$ provides operational connection of terminals U' and U'', as desired, respectively to opposite differential terminals of the output bridge of any one of the family of interlocking amplifiers, said output-bridge opposite differential terminals being $D_3$ and $D_4$ of a three-bridge amplifier or $D_5$ and $D_6$ of a four-bridge amplifier;

(2) That the voltage dropping means of Fig. 14 is most effectively combined with the employment of differential-follower triodes in the output bridge;

(3) That with switch $S_5$ in the "up" position, economy of power sources is available, if desired;

(4) That, with switch $S_1$ closed, and by simultaneously varying the magnitudes of circuit elements 55 and 56 as potential $E_M$ is varied in a plurality of related amplifiers, the midpoint potential between D' and D'' may be made common with ground potential and with accelerating potential impressed on terminal "$A_2$" of a related cathode ray tube thereby reducing "spot distortion."

Referring now to Fig. 15, conventional but not restrictive means is schematically shown energizing the heater elements of the component electronic tubes of the family of interlocking amplifiers.

Circuit characters $H_1$, $H_2$, $H_3$, $H_4$, $H_5$, $H_6$, $H_9$, $H_{10}$, $H_{13}$ and $H_{14}$, also $H_7$, $H_{11}$ and $H_{12}$, respectively indicate the heater elements of component tubes identified by like numerical notation, and a power source is indicated.

Circuit characters 61, 62, and 63 respectively indicate voltage-dropping resistors minimizing the potential difference between the heaters and cathodes of component tubes.

Circuit character 64 indicates a center-tapped heater transformer energized by connection to an indicated power source and energizing the heaters of tubes 7, 11, and 12 in parallel-connection, the center tap of transformer 64 being connected through high resistance 65 to circuit point M.

Except for noting that each pair of tubes is heated in parallel-connection to ensure identical changes in the heater-cathode potential difference in said pair of tubes, the heater energization is believed to be conventional and to require no detailed description herein.

What is claimed is:

1. A linear differential electronic amplifier of an even number of stages comprising, a pair of positive and negative connections to a power source, at least one differential amplifying bridge and a balancing bridge energized by substantially common current in a first current path between said power connections, a second energizing current path including differential amplifying bridges equal in number to said amplifying bridges of the first path connected between said power connections and having substantially common current theretnrough, means maintaining the energizing voltage of said second path substantially below the positive power connection voltage, means maintaining the negative energizing voltage of said second current path substantially above the negative power connection voltage, and means responsive to effective differential midpoint potential of at least one said amplifying bridge controlling conductivity of an adjacent bridge energized by current of said path not energizing last said bridge.

2. A linear differential full wave amplifier for direct and high frequency signals energized from positive and negative terminals of a power supply comprising, first and second adjacent electronic bridges each composed of two similar energizing current branches, said branches being parallel-connected at upper and lower potential terminations, respectively, and each branch comprising a load section and an amplifying tube having at least an anode, cathode and grid as a lower arm, the cathodes of both branches being connected to said lower termination and each branch of at least said first bridge having a fixed impedance as the load section being connected from said anode of the branch to said upper termination thereof, said first bridge and the input section of said second bridge having substantially separate polarizing currents therethrough, the upper termination of the first bridge being supplied by quiescently equal impedance paths through said fixed impedances of the second bridge to provide on respective said upper terminations differing relative potentials whereby the upper potential of the first bridge is fixed relative to the average potential of said anodes of said second bridge, means directly coupling the respective anodes of the first bridge to the grids of the second bridge tubes, respectively, and voltage absorbing means connecting said lower termination of the second bridge to said negative terminal, whereby a signal on either grid of the first bridge is full-wave-differentially amplified therein.

3. A linear full-wave-differential electronic amplifier for direct and alternating current signals comprising, positive and negative power source connections, a plurality of differential amplifying bridges each incorporating in first and second arms thereof, respectively, an amplifying device having a cathode both being at a common current connection and an anode respectively energized through a load section impedance the lower potential ends thereof forming diagonal points of the bridge, grid control being confined to substantially equal and opposite variations from a midpoint potential below and approximating the potential at said common connection, said bridges being arrayed in two substantially independent current paths between said power source connections, and at least one bridge of each said path having said grid control taken from said diagonal points of a bridge of the opposite said path, thereby establishing corrective voltage control and phase fidelity in the amplifier by feedback essentially non-degenerative in character.

4. The amplifier of claim 3 including voltage dropping means in the respective current paths external to said bridges thereof and means equalizing the quiescent energizing currents in the respective said paths and in the parallel arms of at least one said bridge.

5. A linear differential electronic amplifier for direct and alternating current signals with positive and negative connections to a power source and employing amplification by differential amplifier bridges each comprising a pair of amplifying tubes parallel-energized by direct-joining to negative supply therefor of cathode elements respectively therein and by connection of respective anodes therein individually through load section impedances to common energizing voltage, said tubes further having grid elements arranged for full-wave signal response, said amplifier comprising, a first energizing current path through series energized electrical bridges the one thereof at highest energizing voltage being a differential amplifier bridge, the path being connected between said power connections, a second energizing current path through additional series energized differential amplifier bridges connected between said power connections, means maintaining the positive supply voltage of first said path substantially below the positive power connection voltage, means maintaining the negative supply voltage of second said path substantially above the negative power connection voltage, and stabilizing voltage distributing means responsive to bridge cross-diagonal midpoint potential of each said differential amplifier bridge comprising direct connection of bridge input tube grids, respectively, to adjacent-bridge cross-diagonal junctions thus controlling aggregate conductance of current in the other said current path through cathode biasing action, thereby to provide progressive-non-degenerative feedback correction particular to each amplifying bridge.

6. The amplifier of claim 5 wherein first said voltage maintaining means comprises a grid-controlled voltage-regulating conductance having the grid potential thereof midway between the potentials of cross-diagonal junctions of said bridge of highest energizing voltage in said second current path and having the controlled voltage therefrom at said highest voltage of first said path, whereby both current paths are voltage-regulated internally by crossresponsive cathode biasing action.

7. In the amplifier of claim 5 first said voltage maintaining means comprising a grid-controlled voltage-regulating conductance having the grid voltage thereof supplied from the electrical midpoint of an output impedance in the differential diagonal of said highest voltage differential amplifier bridge, the controlled voltage therefrom being the said highest voltage of first said path, both current paths being internally voltage-regulated by crossresponsive stabilization.

8. The amplifier of claim 5 wherein said negative supply voltage means comprises a resistance in the common cathode circuit of a pair of input tubes of said amplifying bridge at lowest voltage of second said path, the potential drop thereacross being controlled by the midpoint potential between cross diagonal points of said bridge at lowest voltage of the first path.

9. The amplifier of claim 5 whereof the bridge of the second path at highest energizing voltage comprises amplifier tubes in the first and second arms thereof, respectively, and differential follower tube circuits in the third and fourth arms thereof, respectively, bridge output being taken across the diagonal thereof and said follower tubes being grid-controlled by current in said first and second arms, respectively.

10. The amplifier of claim 5 wherein the bridge at lowest energizing voltage of said first path has in first and second arms thereof resistive paths of complementary variability and in third and fourth arms thereof grid-controlled impedances of which the grid voltages are derived from a resistance connected as amplifier fullwave input.

11. In an amplifier energized at positive and negative supply terminals, having a differential amplifying output bridge and a second differential amplifying bridge each having a pair of amplifying tubes respectively connected with plate-to-cathode circuit as first and second bridge arms each tube having cathode, plate and grid elements whereof said cathodes of each bridge are joined to form respective bridge negative terminations, each bridge further comprising third and fourth arms joined to form respective bridge positive terminations and being impedance units connected to a respective plate of a said tube as a load thereof, the latter said connections forming cross-diagonal points in each bridge, said negative terminations being connected separately through cathode biasing means to said negative supply terminal and said positive terminations being connected for bridge energization from said positive supply terminal, also having stabilizing triode means conductively connected between said positive terminal and said positive termination of said second bridge and grid-connected to impose variations in the mean potential at respective said cross-diagonal points of said output bridge in-phase upon said positive termination of said second bridge and having means imposing the variations of potential at said cross-diagonal points of said second bridge respectively upon said grids of said output bridge, further amplifier structure comprising, a symmetrical bridge of four joined impedance arms energized by connection of one impedance junction therein to said negative supply terminal and another impedance junction therein to said negative termination of said output bridge, two remaining impedance junctions therein being respective cross-diagonal points of said symmetrical bridge, and means transferring variations of potential at last said junctions respectively to said grids of said second bridge thereby to control components of current in such bridge in response to said potential variations at said output bridge negative termination.

12. In an amplifier according to claim 11 said four impedance arms including triode conductance elements respectively forming the third and fourth arms, said triode conductance elements having plates joined to form the bridge positive termination, having cathodes respectively constituting said cross-diagonal points and further having grids respectively connected for opposite signal excitation, the first and second arms of the impedance bridge including bridge balancing means.

13. In an amplifier according to claim 11 said symmetrical bridge being a third similar amplifying bridge including first and second arm amplifying tubes cathode-junctioned and connected to said negative supply terminal and third and fourth impedance arms junctioned at a positive termination connected to said negative termination of said output bridge and arranged for signal input applied to control grids therein, differentially amplified signal being thereby passed to said second bridge grids.

14. In an amplifier according to claim 11 said tubes of said second bridge having screen grids connected for energization by current from said negative termination of the output bridge.

15. In an amplifying array energized at positive and negative supply terminals, first and second amplifying bridges of which each has first and second amplifying tubes forming first and second arms, respectively, the tubes containing cathode, grid and plate elements, said cathodes of each bridge being joined to form a bridge negative terminal, each bridge having third and fourth arms comprising impedances joined at a positive bridge terminal and respectively connected as loads for said first and second arm tube plates, said load connections including respective cross-diagonal points of the bridges and said third and fourth arms of at least said second bridge being fixed impedances, discrete positive supplies for the aggregate currents in the amplifying arms of said bridges from said positive supply terminal, a resistive path connecting the common cathode junction of the second bridge to said negative supply terminal, a further impedance bridge having cross-diagonal points connected respectively to said grids of the second bridge and forming a common impedance path between cathodes of the first bridge and negative supply, means imposing the potentials of said cross-diagonal points of the second bridge respectively upon said grids of the first bridge, and means impressing input signal upon said cross-diagonal points of said further impedance bridge, each said amplifying bridge being thereby connected in control of and under control of aggregate conduction of the other.

16. In an amplifying array energized at positive and negative supply terminals, first and second direct-coupled amplifying bridges of which each has first and second amplifying tubes forming first and second arms, respectively, the tubes containing at least cathode, grid and plate elements, said cathodes of each bridge being joined by connection to a bridge negative terminal, each bridge having third and fourth impedance arms joined at a bridge positive terminal and respectively connected as loads for said first and second arm tube plates said connections including respective cross-diagonal points of the bridges and said third and fourth arms of at least said second bridge being fixed impedances, stabilizing means supplying from said supply terminals to said bridge terminals first and second energizing currents without substantial common aggregate current through the first and second tube arms of said first and second bridges, a resistive path connecting the cathode junction of the second bridge to said negative supply terminal, a further impedance bridge having cross-diagonal points connected to said grids of the second bridge and forming a common impedance path between cathodes of the first bridge and negative supply, means imposing the potentials of said cross-diagonal points of the second bridge respectively upon said grids of the first bridge, and means impressing input signal upon said cross-diagonal points of said further impedance bridge, each said amplifying bridge being thereby connected in control of and under control of aggregate conduction of the other.

17. A linear full wave differential electronic amplifier structure comprising a pair of positive and negative voltage supplies, a plurality of differential amplifier bridges energized each between an upper and a lower potential terminal and connected in two adjacent sequences each of which is energized by current substantially individual thereto by connection between said voltage supplies, a particular said sequence comprising a first bridge having complementarily-variable conductance elements in the first and second arms thereof and like conductance elements respectively in the third and fourth arms thereof, the first and second arm junction and the third and fourth arm junction being said lower and upper potential terminals, said particular sequence having one said differential amplifier bridge therein between said third and fourth arm junction and said positive supply, last said bridge comprising vacuum tube conductance elements in the first and second arms thereof and like conductance elements in the third and fourth arms thereof each connected as the load for a said tube element energized therethrough, the junction of said first and second arms and the junction of said third and fourth arms being bridge energizing terminals, and the other said sequence comprising an amplifying bridge including in first and second arms thereof vacuum tube conductance elements and in the third and fourth arms thereof like conductance elements and of which the junction of said tube elements and the junction of said like conductance elements form lower potential and upper potential energizing terminals and of which each said like conductance element forms a load in the current supply for one of said tube elements, one said bridge sequence being energized by connection of said upper potential terminal to said positive supply through a grid-controlled variable conductance element, the grid thereof being responsively connected to means establishing a midpoint potential between bridge cross-diagonal opposite junctions of said tube elements and like conductance elements of a bridge of opposite said sequence connected as a signal output bridge, said amplifier having in each said sequence at least one amplifying bridge, there being at least three bridges including said first bridge, each of said bridges having cross-diagonal points connected respectively to grids of an adjacent bridge except said output bridge having said midpoint potential connected to the grid of said grid-controlled variable conductance element, whereby an amplifying bridge of each energizing sequence is controlled by third and fourth arm load currents of a bridge of the other energizing sequence.

18. The amplifier structure of claim 1 wherein an initial said amplifying bridge has an additional pair of grids respectively controlling said tube conductance elements of the bridge, last said pair of grids being connected across an input impedance operatively centered at said negative supply and forming thereby an amplifier signal input circuit.

19. The amplifier structure of claim 17 wherein said like conductance elements of said first bridge are a pair of triode tubes having anodes therein joined at energizing voltage thereto, cathodes respectively coupled to grids of an initial amplifying bridge, and having grids connected across a signal input impedance.

20. The amplifier structure of claim 1 wherein said like conductance elements in the third and fourth arms of one said amplifying bridge are oppositely adjustable to effect equality of quiescent voltage drops respectively across the third and fourth arms of last said amplifying bridge in the absence of amplified signal.

21. The amplifier structure of claim 1 in which variable resistance means interconnects said grids of an instant said amplifying bridge for gain control of the amplifier, said resistance means being a shunt path between opposite diagonal points of an adjacent inferior said amplifying bridge.

22. The amplifier structure of claim 1 in which said tube conductance elements of a said amplifying bridge operating as an output bridge contain screen grids respectively controlled through a common voltage dropping resistor from a said regulated voltage established by said grid-controlled conductance element.

23. The amplifier structure of claim 1 wherein said lower potential terminal of a final said amplifying bridge is connected to said negative supply through current bleeding means whereby the last said bridge may conduct more current and deliver greater power than employed in the remaining circuit for the energizing current particular thereto.

24. The amplifier structure of claim 1 the like conductance elements in said third and fourth arms of first said bridge each being an input and balancing triode and having a control grid, said control grids thereof being interconnected through an impedance element centered at said negative supply and being the amplifier input impedance, said input triodes having cathodes at signal-varied potential respectively in control of said tube element of the first amplifying bridge of the adjacent sequence.

25. An amplifier structure according to claim 24 including an odd number of amplifying bridges and an auxiliary stabilizing bridge comprising first and second resistive arms comprised of said input impedance, third and fourth arms thereof being stabilizing triodes energized by common anode connection through voltage dropping means to said grid-controlled conductance element, last said triodes having cathodes connected respectively to said first and second resistance arms and having grids respectively connected across an auxiliary input impedance centered at said negative voltage supply, thereby substantially cancelling overall phase discrepancy in the amplifier.

26. The amplifier of claim 1 wherein a pair of triodes constitute the third and fourth arms, respectively, of the final amplifying bridge, said pair of triodes being connected in full-wave-differential-follower relationship and having cathodes and a differential output load impedance connected therebetween, said differential output load impedance having a midpoint with potential particular thereto impressed directly on the control-grid of said grid-controlled variable conductance element.

27. In an amplifier energized at positive and negative supply terminals, an output bridge, a compensating bridge and an impedance bridge each being a symmetrical bridge including third and fourth impedance arms junctioned at a positive termination and first and second impedance arms junctioned at a negative termination, said first and third arms of each bridge being therein junctioned and said second and fourth arms of each bridge being therein junctioned to form for that bridge respective cross-diagonal points, said cross-diagonal points of said output bridge having connected therebetween a resistive element including a center tap, said first- and second-arm elements of said impedance bridge being variable, said output and compensating bridges being amplifying bridges whereof each of said third and fourth impedance arms is arranged as a load-impedance element respectively for a said first and a said second arm each constructed of one cathode-to-plate electron circuit of a pair of tubes each including at least cathode, plate and grid elements, said positive termination of said output bridge being connected to said positive supply terminal and said negative termination of said impedance bridge being connected to said negative supply terminal, current-cascading means including connection of said negative termination of said output bridge to said positive termination of said impedance bridge thereby to energize said output and impedance bridges by common current at least in part therethrough, current-dividing means for energizing said compensating bridge with amplifier current complementary to said common current including a voltage-dropping resistive connection between said positive supply terminal and said positive termination of said compensating bridge and also including cathode-biasing impedance means connected between said negative termination of said compensating bridge and said negative supply terminal, potential-control means providing, at said positive termination of said compensating bridge, potential responsive to the mean of potentials respectively at said cross-diagonal points of said output bridge and including in said voltage-dropping connection a stabilizing triode having at least cathode, plate and grid elements the plate being connected to said positive supply terminal, the cathode to said positive termination of said compensating bridge and the grid to said center tap, cross responsive means providing, at said negative termination of said output bridge, potential responsive to the mean of potentials respectively at said cross-diagonal points of said compensating bridge and including connection of said cross-diagonal points of said compensating bridge each to a respective said grid included one in each of said tubes of said output bridge, bridge-voltage-interlocking means including connection of said cross-diagonal points of said impedance bridge each to a respective said grid included one in each of said tubes of said compensating bridge controlling said common current and said complementary current each responsive to the other through control, at said negative termination of said compensating bridge, potential responsive to potentials respectively at said cross-diagonal points of said impedance bridge, and signal-input means including connections placing signal voltage in control of said cathode-to-plate electron circuits of said tubes of said compensating bridge.

28. In an amplifier according to claim 27, each of said tubes of said compensating bridge having a screen-grid energized by connection to said negative termination of said output bridge.

29. In an amplifier according to claim 28, each of said tubes of said output bridge having a screen-grid energized by connection to said positive termination of said compensating bridge.

30. In an amplifier according to claim 27, said first and second arms of said impedance bridge being tubes having similar elements connected as in said amplifying bridges and having connected between said negative termination of said impedance bridge and said negative supply terminal a cathode-biasing resistor, said cathode-biasing impedance means being a further impedance bridge similarly having positive and negative terminations and respective cross-diagonal points and similarly having impedance-element arms, said cross-diagonal points of said further impedance bridge being respectively connected each to a said grid included one in each of said tubes of said impedance bridge.

31. In an amplifier according to claim 30, each of said third- and fourth-impedance-element arms of said further impedance bridge being one cathode-to-plate electron circuit of a pair of triodes each including at least cathode, plate and grid elements whereof said plates are junctioned at said positive termination of said further impedance bridge said cathodes respectively being at respective cross-diagonal points of said further impedance bridge and whereof said grids are respectively impedance-connected to said negative supply terminal.

32. In an amplifier according to claim 31, stabilizing-bridge means providing a feedback loop opposing variation of energizing voltage at said center tap and including a pair of triodes each having at least cathode, plate and grid elements of which the plates are junctioned and connected to said positive termination of said compensating bridge, of which the cathodes are connected respectively to said grids impedance-connected to said negative supply terminal and of which the grids are respectively impedance-connected to said negative supply terminal.

33. In an amplifier energized at positive and negative supply terminals, an output bridge, a compensating bridge and an impedance bridge each being a symmetrical bridge including third and fourth arms junctioned at a positive termination and first and second arms junctioned at a negative termination, each of said first and second arms being a variable-impedance element and each of said third and fourth arms being an impedance element, said first and third arms of each bridge being therein junctioned and said second and fourth arms of each bridge being therein junctioned to form for that bridge respective cross-diagonal points, said cross-diagonal points of said output bridge having connected therebetween a resistive element including a center tap, said output and compensating bridges being amplifying bridges whereof each of said first- and second-arm variable-impedance elements is the cathode-to-plate electron circuit in one of a pair of tubes each including at least cathode, plate and grid elements, said positive termination of said output bridge being connected to said positive supply terminal and said negative termination of said impedance bridge being connected to said negative supply terminal, current-cascading means including connection of said negative termination of said output bridge to said positive termination of said impedance bridge thereby to energize at least in part said output and impedance bridges by common current therethrough, current-dividing means for energizing said compensating bridge with amplifier current complementary to said common current including a voltage-dropping resistive connection between said positive supply terminal and said positive termination of said compensating bridge and including cathode-biasing impedance means connected between said negative termination of said compensating bridge and said negative supply terminal, potential-control means impressing the approximate mean of potential variations respectively at said cross-diagonal points of said output bridge upon said positive termination of said compensating bridge last-said means including direct-current control of potential established by said current-dividing means, cross-responsive means including connection of said cross-diagonal points of said compensating bridge each to a respective said grid included one in each of said tubes of said output bridge providing at said negative termination thereof potential responsive to potentials respectively at said cross-diagonal points of said compensating bridge, bridge-voltage interlocking means including connection of said cross-diagonal points of said impedance bridge each to a respective said grid included one in each of said tubes of said compensating bridge controlling said common current and said complementary current each responsive to the other through control, at said negative termination of said compensating bridge, potential responsive to potentials respectively at said cross-diagonal points of said impedance bridge, and signal-input means including connections placing signal voltage in control of said cathode-to-plate electron circuits of said tubes of said compensating bridge.

No references cited.

UNITED STATES PATENT OFFICE
CERTIFICATE OF CORRECTION

Patent No. 2,826,646                                  March 11, 1958

John E. Williams

It is hereby certified that error appears in the printed specification of the above numbered patent requiring correction and that the said Letters Patent should read as corrected below.

Column 38, lines 18, 31, 37, 43, 49 and 56, and column 39, line 3, for the claim reference numeral "1", each occurrence, read --17--.

Signed and sealed this 15th day of July 1958.

(SEAL)
Attest:

KARL H. AXLINE                                        ROBERT C. WATSON

Attesting Officer                                     Commissioner of Patents